US011933073B2

(12) United States Patent
Pukari

(10) Patent No.: US 11,933,073 B2
(45) Date of Patent: Mar. 19, 2024

(54) DIGITAL LOCK

(71) Applicant: ILOQ OY, Oulu (FI)

(72) Inventor: Mika Pukari, Helsinki (FI)

(73) Assignee: ILOQ OY, Oulu (FI)

( * ) Notice: Subject to any disclaimer, the term of this patent is extended or adjusted under 35 U.S.C. 154(b) by 0 days.

(21) Appl. No.: 18/082,318

(22) Filed: Dec. 15, 2022

(65) Prior Publication Data

US 2023/0120520 A1 Apr. 20, 2023

Related U.S. Application Data

(63) Continuation of application No. 16/956,757, filed as application No. PCT/FI2019/050078 on Feb. 4, 2019, now Pat. No. 11,566,446, which is a continuation of application No. 16/138,664, filed on Sep. 21, 2018, now Pat. No. 10,450,777, which is a continuation of application No. 15/958,604, filed on Apr. 20, 2018, now Pat. No. 10,253,528.

(60) Provisional application No. 62/633,316, filed on Feb. 21, 2018.

(30) Foreign Application Priority Data

Sep. 5, 2018 (EP) .................................... 18192832

(51) Int. Cl.
*E05B 47/00* (2006.01)
*G07C 9/00* (2020.01)

(52) U.S. Cl.
CPC ...... *E05B 47/0005* (2013.01); *E05B 47/0038* (2013.01); *G07C 9/00174* (2013.01); *G07C 9/00722* (2013.01); *G07C 9/00563* (2013.01); *G07C 9/00698* (2013.01); *G07C 9/00817* (2013.01); *G07C 9/00896* (2013.01)

(58) Field of Classification Search
CPC .. E05B 47/00; E05B 47/0005; E05B 47/0038; G07C 9/00174; G07C 9/00722; G07C 9/00563; G07C 9/00698; G07C 9/00817; G07C 9/00896; Y10T 70/7057
USPC .......................................................... 70/276
See application file for complete search history.

(56) References Cited

U.S. PATENT DOCUMENTS 3,379,214 A 4/1968 Weinberg
3,751,086 A 8/1973 Geringer
3,855,827 A 12/1974 Hallman et al.
4,784,415 A 11/1988 Malaval
(Continued)

FOREIGN PATENT DOCUMENTS

CA 2878118 A1 1/2014
CN 2251780 Y 4/1997
(Continued)

OTHER PUBLICATIONS

Office Action dated Feb. 15, 2023 in Isreal Counterpart Application No. 275303.
(Continued)

*Primary Examiner* — Suzanne L Barrett
(74) *Attorney, Agent, or Firm* — Patterson + Sheridan, LLP

(57) ABSTRACT

A locking system is described. The locking system, includes a lock. The lock includes a semi-hard magnet and a hard magnet. The hard magnet is configured to move to open or close the lock, the lock is self-powered using near field communication (NFC), and the lock is digitally controlled using a mobile application.

16 Claims, 34 Drawing Sheets

(56) References Cited

U.S. PATENT DOCUMENTS

| | | | | |
|---|---|---|---|---|
| 5,029,912 | A | 7/1991 | Gotanda | |
| 5,271,253 | A | 12/1993 | Cassada et al. | |
| 5,339,662 | A | 8/1994 | Goldman | |
| 5,854,589 | A | 12/1998 | How et al. | |
| 6,035,675 | A | 3/2000 | Zimmer | |
| 6,154,590 | A | 11/2000 | Jin et al. | |
| 6,155,089 | A | 12/2000 | Hurskainen et al. | |
| 6,499,325 | B1 | 12/2002 | Hurskainen | |
| 6,594,068 | B2 | 7/2003 | Sui | |
| 6,987,027 | B2 | 1/2006 | Jin | |
| 8,943,187 | B1 | 1/2015 | Saylor | |
| 9,533,724 | B2 | 1/2017 | Troy et al. | |
| 9,779,567 | B1 | 10/2017 | Shen | |
| 10,253,528 | B1 | 4/2019 | Pukari | |
| 10,443,269 | B2 | 10/2019 | Piirainen et al. | |
| 10,450,777 | B2 | 10/2019 | Pukari | |
| 10,641,008 | B2 | 5/2020 | Pukari | |
| 10,844,632 | B2 | 11/2020 | Pukari | |
| 10,890,014 | B2 | 1/2021 | Pukari | |
| 11,619,069 | B2 | 4/2023 | Pukari | |
| 2001/0027671 | A1 | 10/2001 | Davis | |
| 2002/0009254 | A1 | 1/2002 | Sui | |
| 2004/0055346 | A1 | 3/2004 | Gillert | |
| 2009/0031767 | A1 | 2/2009 | Ko et al. | |
| 2010/0180649 | A1 | 7/2010 | Harvey | |
| 2012/0131967 | A1 | 5/2012 | Sanchez Giraldez | |
| 2013/0229227 | A1 | 9/2013 | Maniwa | |
| 2013/0229277 | A1 | 9/2013 | Liao | |
| 2014/0060803 | A1 | 3/2014 | Gano | |
| 2014/0152420 | A1 | 6/2014 | Wolski | |
| 2015/0101370 | A1 | 4/2015 | Russo et al. | |
| 2015/0152420 | A1 | 6/2015 | Bao et al. | |
| 2016/0284144 | A1 | 9/2016 | Michalscheck et al. | |
| 2017/0098336 | A1 | 4/2017 | Ady et al. | |
| 2017/0226784 | A1 | 8/2017 | Davis et al. | |
| 2017/0243425 | A1 | 8/2017 | Meganck et al. | |
| 2017/0247913 | A1 | 8/2017 | Horeth et al. | |
| 2018/0096570 | A1 | 4/2018 | Khoshkava et al. | |
| 2018/0154034 | A1 | 6/2018 | Jin et al. | |
| 2018/0219552 | A1 | 8/2018 | Casparian | |
| 2019/0103751 | A1 | 4/2019 | Wang et al. | |
| 2020/0080688 | A1 | 3/2020 | Weiler et al. | |
| 2020/0392758 | A1 | 12/2020 | Elsmark | |
| 2021/0134096 | A1* | 5/2021 | Pukari | H04B 5/0037 |

FOREIGN PATENT DOCUMENTS

| | | | | | |
|---|---|---|---|---|---|
| CN | 2560712 | Y | | 7/2003 | |
| CN | 203271335 | U | | 11/2013 | |
| CN | 205078014 | U | | 3/2016 | |
| CN | 205078026 | U | | 3/2016 | |
| CN | 106934892 | A | * | 7/2017 | |
| CN | 107489310 | A | | 12/2017 | |
| CN | 107798759 | A | * | 3/2018 | G07C 9/00563 |
| CN | 107967733 | A | * | 4/2018 | G07C 9/00563 |
| CN | 108062810 | A | * | 5/2018 | G07C 9/00174 |
| CN | 109360303 | A | * | 2/2019 | |
| CN | 110453995 | A | * | 11/2019 | |
| CN | 107847938 | B | * | 3/2020 | E05B 47/0012 |
| DE | 4323394 | A1 | | 1/1995 | |
| DE | 4428427 | A1 | | 2/1996 | |
| DE | 19923786 | A1 | | 12/1999 | |
| DE | 202014003440 | U1 | | 7/2015 | |
| DE | 102015213807 | A1 | | 1/2017 | |
| DE | 102016205831 | A1 | | 10/2017 | |
| EP | 0316811 | A2 | | 5/1989 | |
| EP | 0962610 | A2 | | 12/1999 | |
| EP | 1030091 | A1 | | 8/2000 | |
| EP | 1087079 | A1 | | 3/2001 | |
| EP | 1443162 | A2 | | 8/2004 | |
| EP | 1705321 | A1 | | 9/2006 | |
| EP | 1953774 | A2 | | 8/2008 | |
| EP | 3118977 | A1 | | 1/2017 | |
| EP | 3217365 | A1 | | 9/2017 | |
| ES | 2344450 | T3 | | 8/2010 | |
| GB | 2429032 | A | | 2/2007 | |
| GB | 2453839 | A | | 4/2009 | |
| JP | S4827294 | U | | 4/1973 | |
| JP | H06167149 | A | | 6/1994 | |
| JP | H7219456 | A | | 8/1995 | |
| JP | 2003184370 | A | | 7/2003 | |
| JP | 2009187632 | A | | 8/2009 | |
| JP | 2012083997 | A | | 4/2012 | |
| KR | 19930014529 | U | | 7/1993 | |
| KR | 20010027287 | A | | 4/2001 | |
| WO | 8810388 | A1 | | 12/1988 | |
| WO | 2017115961 | A1 | | 7/2017 | |
| WO | 2018005528 | A1 | | 1/2018 | |
| WO | 2019162560 | A1 | | 8/2019 | |
| WO | 2019162561 | A1 | | 8/2019 | |

OTHER PUBLICATIONS

Dulsha K. Abeywardana et al., "Pulse Controlled Microfluidic Actuators with Ultra Low Energy Consumption," Sensors and Actuators A 263, (2017) 8-22, pp. 1-15.
Advanced Encryption Standard Process, Wikipedia, <https://en.wikipedia.org/wiki/Advanced_Encryption_Standard_process>, printed Feb. 4, 2019, pp. 1-3.
Chinese Patent Office, Notification of the Second Office Action for Application 2019800066118 dated Sep. 13, 2021.
Office Action dated Apr. 22, 2021 in Chinese Counterpart application No. 201980006118.
Office Action dated May 12, 2021 in European Counterpart application No. 19212497.2.
Extended European Search Report dated May 18, 2020 in EP Application No. 19212497.2.
European Patent Office Extended European Search Report for Application No. 18192832.6-1005 dated Jun. 13, 2019.
European Patent Office Extended European Search Report for Application 19758102.8 dated Oct. 29, 2021.
European Patent Office Extended European Search Report for Application 19757604.4 dated Nov. 3, 2021.
International Search Report for Application No. PCT/F12019/050079 dated Apr. 16, 2019.
International Search Report for Application No. PCT/FI2019/050078 dated Apr. 16, 2019.
International Search Report for Application No. PCT/FI2019/050114 dated Apr. 16, 2019.
European Patent Office, Extended European Search Report for Application 19757603.6 dated Nov. 2, 2021.
Extended European Search Report dated Jan. 17, 2023 in EP Application No. 22203681.6.
Intellectual Property Office: Request for The Submission of An Opinion for Application 10-2020-7017187 dated Jan. 30, 2023.
European Patent Office, Communiation Pursuant to Article 94(3) EPC for Application 19 757 603.6-1005 dated Nov. 30, 2022.
Japanese Patent Office, Notice of Reasons for Rejection for Application 2020-535181 dated Dec. 6, 2022.

* cited by examiner

70

DIGITAL LOCK

CROSS-REFERENCE TO RELATED APPLICATIONS

The present disclosure is a continuation of U.S. Non-Provisional patent application Ser. No. 16/956,757 filed Jun. 22, 2020, which is a U.S. National Phase Entry of PCT Application Serial No. PCT/FI2019/050078 filed Feb. 4, 2019, which claims priority to U.S. Non-Provisional patent application Ser. No. 16/138,664 filed Sep. 21, 2018 and issued on Oct. 22, 2019 as U.S. Pat. No. 10,450,777, which is a continuation of U.S. Non-Provisional patent application Ser. No. 15/958,604 filed Apr. 20, 2018 and issued on Apr. 9, 2019 as U.S. Pat. No. 10,253,528, which claims benefit of U.S. Provisional Patent Application Ser. No. 62/633,316 filed Feb. 21, 2018.

TECHNICAL FIELD

The invention generally relates to locks, and more particularly to digital locks.

BACKGROUND

Electromechanical locks have replaced traditional mechanical locks. The electromechanical locks are locking devices operated using magnetic field forces or electric current. Electromechanical locks are sometimes stand-alone with an electronic control assembly mounted directly to the lock. Further, the electromechanical locks use magnets, solenoids, or motors to actuate the lock by either supplying or removing power. The electromechanical locks are configured to operate between a locked state and an unlocked state. Generally, in a locked state of the electromechanical lock, there is constant supply of electric power to electromagnet to retain the electromechanical lock in the locked state. In addition, due to the use of motors, consumption of energy by the electromechanical lock is high.

However, the electromechanical locks involve risks of malfunction in electric contacts in the motor and risks of contamination in the gear and motor bearings. The electromechanical locks are less secure as the break-in security of the electromechanical locks is often easy to breach by configuring them to an openable state. Further, the electromechanical locks are larger in size and are not easy to implement. The manufacturing cost and assembling cost of the electromechanical locks is expensive. Energy consumption by the electromechanical locks is higher as the electromechanical locks consume electricity when the electromechanical locks are in the locked state.

An electromechanical lock utilizing magnetic field forces is disclosed in EP 3118977A1. This document is cited here as reference.

A reduced power consumption electromagnetic lock is disclosed in US 20170226784A1. This document is also cited here as reference.

A pulse controlled microfluidic actuators with ultra-low energy consumption is disclosed in Sensors and Actuators A 263 (2017) 8-22. This document is also cited here as reference.

However, the prior art locks are deficient in having many unnecessary parts and consuming a lot of energy in the locked state.

SUMMARY

It is an object of the invention to address and improve the aforementioned deficiency in the above discussed prior art (s).

It is an object of the invention to reduce energy consumption of a lock when in a locked state.

It is an object of the invention to control operation of a digital lock using magnets. The digital lock includes at least two magnets. The magnets are responsible for locking and/or unlocking of the digital lock. The digital lock is a self-powered standalone lock independent of grid electricity powered by any of the following: NFC (near field communication), solar panel, power supply and/or battery or it is powered by the user's muscle (user-powered).

In one aspect of the invention, the digital lock includes a semi hard magnet inside a magnetisation coil and a hard magnet configured to open or close the digital lock. The semi hard magnet and the hard magnet are placed adjacent to each other. A change in magnetisation polarisation of the semi hard magnet is configured to push or pull the hard magnet to open or close the digital lock.

In a further aspect of the invention, the digital lock comprises a first axle, a second axle, and a user interface attached to an outer surface of the lock body and connected to the first axle. The semi hard magnet and the hard magnet are inside the first axle. The digital lock also comprises a position sensor configured to position a notch of the second axle in place for the hard magnet to enter the notch.

In another aspect of the invention, the digital lock features at least one blocking pin configured to protrude into a notch of the lock body. The blocking pins may protrude from the lock body from all different angles.

In another aspect of the invention, when a rest state of the digital lock is to be in the locked state, the digital lock is configured to return to the locked state. Also, when a rest state of the digital lock is to be in the openable state, the digital lock is configured to return to the openable state. In the locked state, the hard magnet is configured to be inside the first axle, and the second axle does not rotate, and the user interface rotates freely. In the openable state, the hard magnet is protruded into the notch of the second axle.

A digital lock comprising at least two magnets, characterized in that, one magnet is a semi-hard magnet and other magnet is a hard magnet and the hard magnet is configured to move to open or close the digital lock.

A software program product configured to control operation of a digital lock comprising at least two magnets, characterised in that,

- one magnet is a semi-hard magnet;
- other magnet is a hard magnet; and
- a processing module configured to control operation of the digital lock, the processing module comprising:
  - an input module configured to receive an input from a user interface;
  - an authentication module configured to authenticate the input received by the user interface;
  - a database to store identification information of one or more users; and
  - an output module configured to control a power source to power the magnetization coil to change the magnetization polarization of the semi hard magnet in response to successful identification of a user, and configured to control the hard magnet to open or close the digital lock.

A method for controlling a digital lock, the method comprising;

- providing at least two magnets, characterised in that, one magnet is a semi-hard magnet and other magnet is a hard magnet and the hard magnet is configured to open or close the digital lock.

The invention has sizable advantages. Aspects of the invention result in a digital lock that is cheaper compared to the existing electromechanical locks. The digital lock eliminates the use of expensive motors and gear assembly. In addition, the digital lock is smaller in size and easier to implement for different lock systems. The digital lock consumes less energy as compared to the existing mechanical and electromechanical locks even when the digital lock is in the locked state. The digital lock manufacturing process is cost effective and the number of components that constitute the digital lock are also less. The assembling cost of the digital lock is cost effective. The digital lock is reliable as it is capable of operating in a wide range of temperatures and is corrosion resistant. As the digital lock is capable of returning to the locked state, the digital lock is rendered secure.

The digital lock described herein is technically advanced and offers the following advantages: It is secure, easy to implement, small in size, cost effective, reliable, and less energy consuming.

The best mode of the invention is considered to be a less energy consuming motor less digital lock. The digital lock operates based on the magnetisation of a semi hard magnet. The change in polarity of the semi hard magnet is done by means of a magnetisation coil located around the semi hard magnet. The change in magnetisation of the semi hard magnet pushes or pulls a hard magnet into a notch in a lock body of the digital lock, thereby opening the digital lock. In the best mode, the locked state is the rest state, and a minimal amount of energy available from the insertion of a digital key into the digital lock or from an NFC device is sufficient to open the digital lock, as there is no energy consumption in the locked rest state of the digital lock. The blocking pins will be activated if the digital lock is tampered by an external magnetic field or external hit or impulse. Further, if excess force is applied on the digital lock, the axles of the digital lock would break or there may be a clutch, which limits the torque against the pins.

Some of the embodiments are described in the dependent claims.

DETAILED DESCRIPTION OF EMBODIMENTS

The present disclosure provides a digital lock system, method, and a software program product for locking and unlocking of doors.

The digital lock includes at least two magnets. One magnet is a semi hard magnet and the other magnet is a hard magnet. The hard magnet is configured to open or close the digital lock. The semi hard magnet and the hard magnet are placed adjacent to each other. A change in magnetisation polarisation of the semi hard magnet is configured to push or pull the hard magnet to open or close the digital lock. The digital lock includes at least one blocking pin configured to protrude into a notch of the lock body. The blocking pins may protrude from the lock body from all different angles. The blocking pins will be activated if the digital lock is tampered by an external magnetic field or external hit or impulse.

Figure 1:
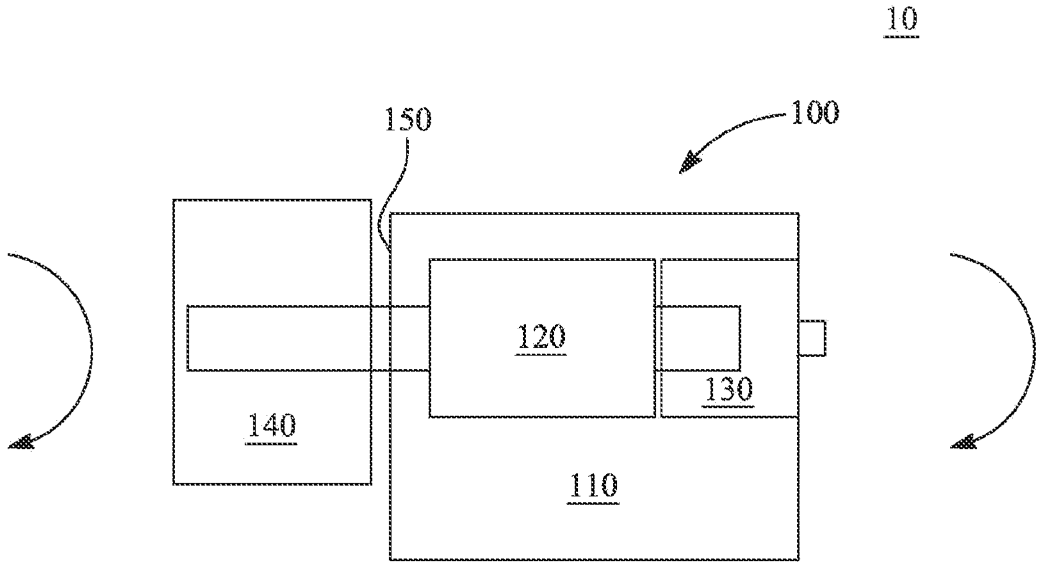
FIG. 1 demonstrates an embodiment 10 of a digital lock, in accordance with the invention as a block diagram.

FIG. 1 demonstrates an embodiment 10 of a digital lock 100, as a block diagram. The digital lock 100 may be low powered lock configured to lock and unlock the door without the requirement of electrical components such as motors. Further, the digital lock 100 provides keyless convenience to a user to lock and unlock the door. The digital lock 100 may include assisting technologies such as, fingerprint access, smart card entry or keypad to lock and unlock the door.

In the illustrated embodiment, the digital lock 100 includes a lock body 110, a first axle 120 configured to be rotatable, a second axle 130 configured to be rotatable, and a user interface 140. The first axle 120 and the second axle 130 are located within the lock body 110. In an example, the first axle 120 and the second axle 130 may be a shaft configured to be rotatable. In addition, the user interface 140 is connected to the first axle 120 of the digital lock 100. In one implementation, the user interface 140 is attached to an outer surface 150 of the lock body 110. In an example, the user interface 140 may be a door handle, a door knob, or a digital key. In the illustrated embodiment, the user interface 140 may be an object used to lock or unlock the digital lock 100. The user interface 140 may include the identification device 210.

Any features of embodiment 10 may be readily combined or permuted with any of the other embodiments 20, 30, 40, 50, 51, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 2:
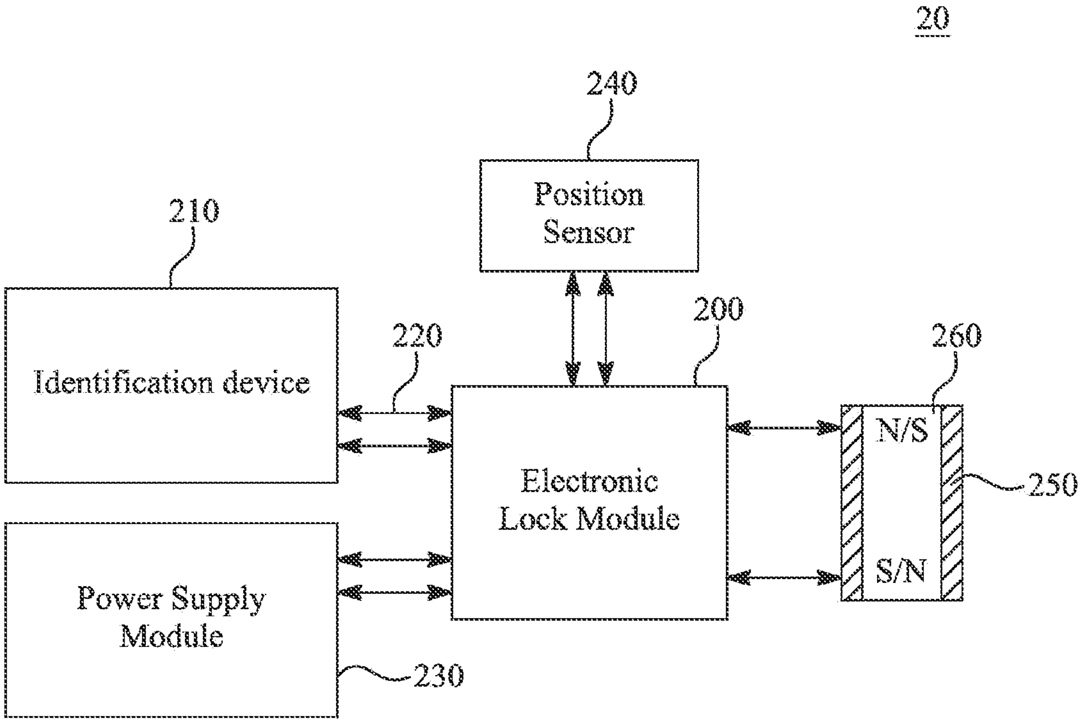
FIG. 2 demonstrates an embodiment 20 of the digital lock, in accordance with the invention as a block diagram.

FIG. 2 demonstrates an embodiment 20 of the digital lock 100, in accordance with the invention as a block diagram. The digital lock 100 further includes an electronic lock module 200 connected to an identification device 210 via a communication bus 220. The communication bus 220 is configured to communicate data between the identification device 210 and the electronic lock module 200.

The identification device 210 is configured to identify a user by any of the following: key tag, fingerprint, magnetic stripe, and/or Near Field Communication (NFC) device. The identification device 210 is capable of identifying the user and allowing access to the user to lock or unlock the digital lock 100 upon authenticating the user from any of the above-mentioned methods of authentication. The fingerprint method of authenticating the user is performed by authenticating an impression left by the friction ridges of a finger of the user.

When the impression of the finger of the user matches above a threshold with the impression stored in the database of the electronic lock module 200, the electronic module 200 via the communication bus 220 authenticates the user. Such authentication of the user leads to locking or unlocking the digital lock 100. In an example, the threshold may be defined as 80 percentage match of the impression of the finger.

The magnetic stripe method of authenticating the user is performed by authenticating the identification information stored in the magnetic stripe. When the identification information stored in the magnetic material pertaining to the user substantially matches with the identification information stored in the database of the electronic lock module 200, the electronic module 200 via the communication bus 220 authenticates the user which leads to locking or unlocking the digital lock 100. In an example, the key tag method of authenticating the user to lock or unlock the digital lock 100 is similar to that of the method used in the magnetic stripe. The key tag method of authenticating the user is performed by authenticating the identification information stored in the key tag. When the identification information stored in the key tag pertaining to the user substantially matches with the identification information stored in the database of the electronic lock module 200, the electronic module 200 via the communication bus 220 authenticates the user which leads to locking or unlocking the digital lock 100.

In some embodiments the key, tag, key tag, or NFC device are copy protected by The Advanced Encryption (AES) standard or a similar encryption method. This encryption standard is cited here as reference.

Figure 3:
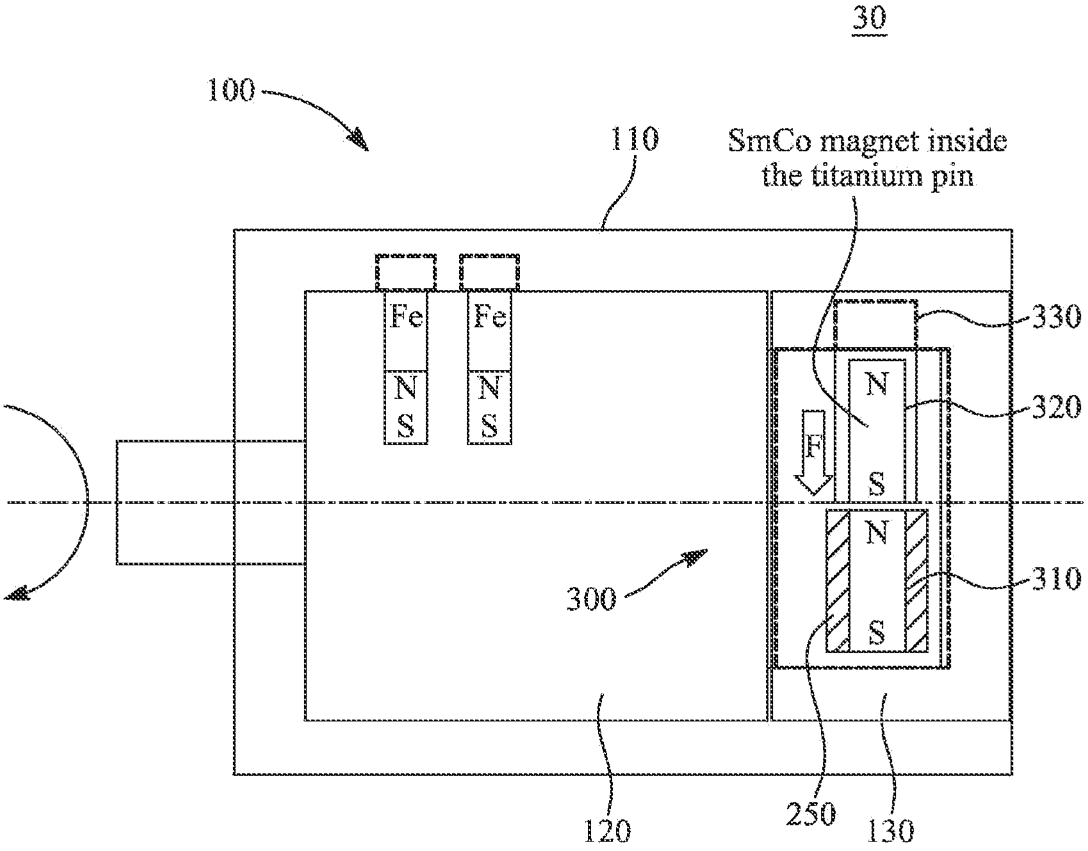
FIG. 3 demonstrates an embodiment 30 of the digital lock in a locked state, in accordance with the invention as a block diagram.

The digital lock 100 includes a power supply module 230 for powering the digital lock 100 by any of the following: NFC source, solar panel, power supply and/or battery. In some embodiments the digital lock may also derive its power from key insertion by the user, or the user may otherwise perform work on the system to power the digital lock. Further, the digital lock 100 includes a position sensor 240 configured to position a notch (not shown) of the second axle 130. The position sensor is optional as some embodiments can be realised without it. The position sensor 240 is connected to the electronic lock module 200 for positioning the notch of the second axle 130 in place for a moveable magnet to enter the notch. In the illustrated embodiment, when the notch of the second axle 130 is not aligned with respect to the moveable magnet, the digital lock 100 is in a locked state (as shown in FIG. 3). The electronic module 200 uses the power supply module 230 to energize a magnetisation coil 250 that magnetizes a non-moveable magnet 260 (also referred to as semi hard magnet as shown in FIG. 3). More particularly, the electronic lock module 200 is electrically coupled with the magnetisation coil 250 to magnetize the non-moveable magnet 260.

Any features of embodiment 20 may be readily combined or permuted with any of the other embodiments 10, 30, 40, 50, 51, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

FIG. 3 demonstrates an embodiment 30 of the digital lock 100 in a locked state 300, in accordance with the invention as a block diagram. The digital lock 100 includes a semi hard magnet 310 and a hard magnet 320 configured to open or close the digital lock 100. The semi hard magnet 310 is placed adjacent to the hard magnet 320. Further, the semi hard magnet 310 is located inside the magnetisation coil 250. In the present implementation, the semi hard magnet 310 is made up of Alnico and the hard magnet 320 is made up of SmCo. In particular, the semi hard magnet 310 is made up of iron alloys which in addition to Iron (Fe) is composed of Aluminium (Al), Nickel (Ni), and Cobalt (Co). In an example, the semi hard magnet 310 may also be made up of copper and titanium. The hard magnet 320 is a permanent magnet made of an alloy of Samarium (Sm) and Cobalt (Co).

The hard magnet 320 may be realised inside a titanium cover in some embodiments. For example the SmCo hard magnet can be placed inside a titanium casing. The casing or cover preferably increases the mechanical hardness and strength of the hard magnet 320 to reduce the effects of wear and tear over time. The casing or cover is preferably also made of light material by weight to limit the aggregate weight of the hard magnet 320. Other materials, not only titanium, may also be used to realise the casing or cover in accordance with the invention.

In an example, the hard magnet 320 may be an object made from a material that can be magnetised and which can create own persistent magnetic field unlike the semi hard magnet 310 which needs to be magnetised.

The semi hard magnet 310 is configured to push or pull the hard magnet 320 to open or close the digital lock 100, in response to change in polarisation of the semi hard magnet 310 by the magnetisation coil 250. In particular, when the digital lock 100 is in the locked state 300, the semi hard magnet 310 is configured to have a polarity such that, the north pole of the semi hard magnet 310 faces the south pole of the hard magnet 320. By virtue of magnetic principle, the semi hard magnet 310 and the hard magnet 320 are attracted to each other. As a result of such arrangement, the hard magnet 320 does not enter into the notch 330 of the second axle 130 of the digital lock 100. In some implementations, it may be understood that the polarity of the semi hard magnet 310 and the hard magnet 320 may be such that, the south pole of the semi hard magnet 310 faces the north pole of the hard magnet 320, causing the semi hard magnet 310 and the hard magnet 320 to be attracted to each other.

Figure 4:
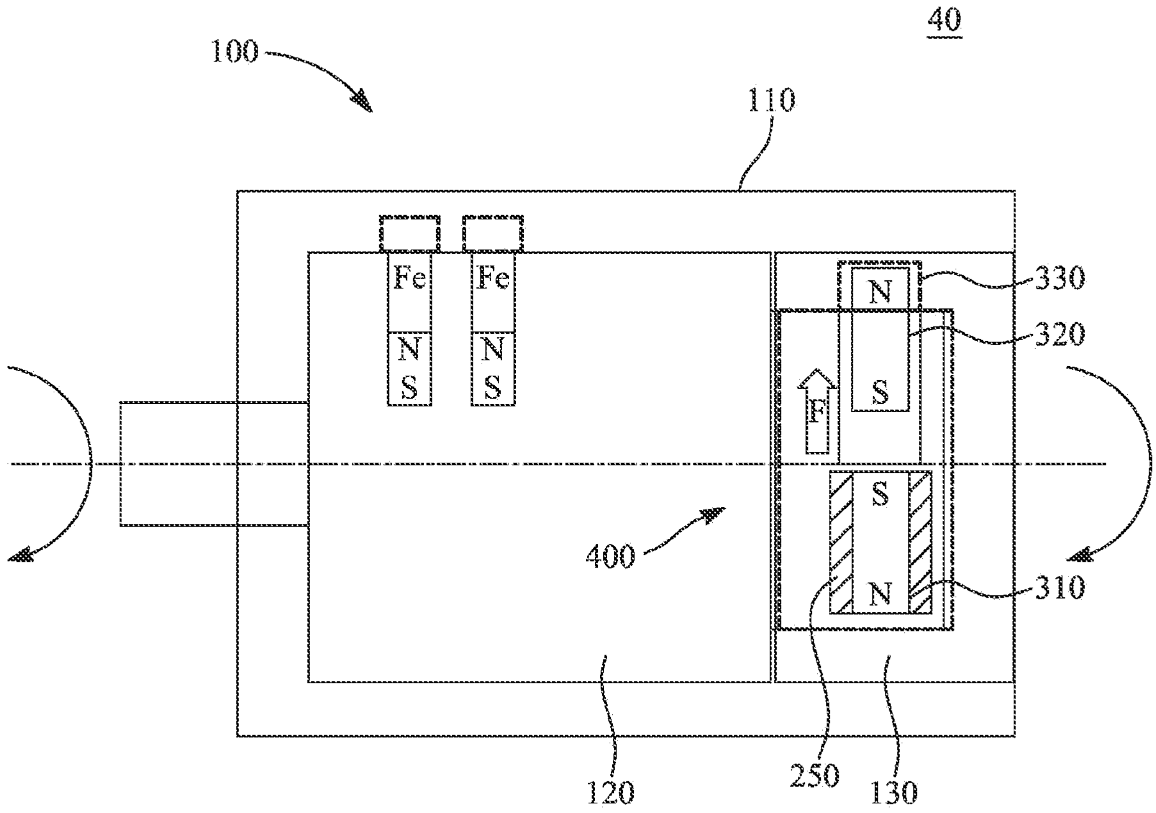
FIG. 4 demonstrates an embodiment 40 of the digital lock in an openable state, in accordance with the invention as a block diagram.

In an example, the digital lock 100 is said to operate between the locked state 300 and an openable state (as shown in FIG. 4). Further, when a rest state of the digital lock 100 is to be in the locked state 300, the digital lock 100 is configured to return to the locked state 300. In an example, the rest state of the digital lock 100 may be defined as the lowest energy state to which the system relaxes to. Further, when the digital lock 100 is in the locked state 300, the first axle 120 and the second axle 130 are not connected to each other. When the digital lock 100 is in the locked state 300, the hard magnet 320 is configured to be inside the first axle 120. In such a condition, the second axle 130 does not rotate as it is not connected to the first axle 120, and the user interface 140 rotates. However, as the hard magnet 320 does not protrude into the notch 330 of the second axle 130, the user may not open the digital lock 100, as the rotation is not translated to turn both axis, as the digital lock 100 is in the locked state 300.

Any features of embodiment 30 may be readily combined or permuted with any of the other embodiments 10, 20, 40, 50, 51, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

FIG. 4 demonstrates an embodiment 40 of the digital lock 100 in an openable state 400, in accordance with the invention as a block diagram. As described earlier with respect to FIG. 3, the digital lock 100 includes the semi hard magnet 310 and the hard magnet 320 configured to open or close the digital lock 100. The semi hard magnet 310 is placed adjacent to the hard magnet 320. Further, the semi hard magnet 310 is located inside the magnetisation coil 250. The semi hard magnet 310 is configured to push or pull the hard magnet 320 to open or close the digital lock 100, when there is a change in polarity of the semi hard magnet 310 by the magnetisation coil 250. In particular, when the digital lock 100 is in the openable state 400 to unlock the digital lock 100, the semi hard magnet 310 is configured to have a polarity such that, the south pole of the semi hard magnet 310 faces the south pole of the hard magnet 320. By virtue of magnetic principle, the hard magnet 320 repels away from the semi hard magnet 310. As a result of such arrangement, the hard magnet 320 enters into the notch 330 of the second axle 130 of the digital lock 100. In some implementations, it may be understood that the polarity of the semi hard magnet 310 and the hard magnet 320 may be such that, the north pole of the semi hard magnet 310 faces the north pole of the hard magnet 320, causing the hard magnet 320 to be repelled away from the semi hard magnet 310.

When a rest state of the digital lock 100 is to be in the openable state 400, the digital lock 100 is configured to return to the openable state 400. This is useful if the lock is in an emergency door that needs to be open, for example.

Further, when the digital lock 100 is in the openable state 400, the first axle 120 and the second axle 130 are connected with each other. When the digital lock 100 is in the openable state 400, the hard magnet 320 is protruded into the notch 330 of the second axle 130. In such a condition, as the hard magnet 320 is protruded into the notch 330 of the second axle 130, the user may be able to open the digital lock 100, as the digital lock 100 is in the openable state 400.

According to the present disclosure, the semi hard magnet 310 and the hard magnet 320 are placed inside the first axle 120 of the digital lock 100. The semi hard magnet 310 is placed below the hard magnet 320 in the first axle 120. Change in polarisation of the semi hard magnet 310 by the magnetisation coil 250 causes the hard magnet 320 to repel into the notch 330 of the second axle 130. Owing to such movement, the digital lock 100 changes to the openable state 400, enabling the opening of the digital lock 100. In some alternate implementations, it may be understood that the semi hard magnet 310 may be placed on top of the hard magnet 320. However, change in polarisation of the semi hard magnet 310 by the magnetisation coil 250 may cause the semi hard magnet 310 to move into the notch 330 of the second axle 130. Owing to such movement of the semi hard magnet 310 into the notch 330 of the second axle 130, the digital lock 100 may be in the openable state 400, thereby allowing the user to open the digital lock 100.

Any features of embodiment 40 may be readily combined or permuted with any of the other embodiments 10, 20, 30, 50, 51, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 5A:
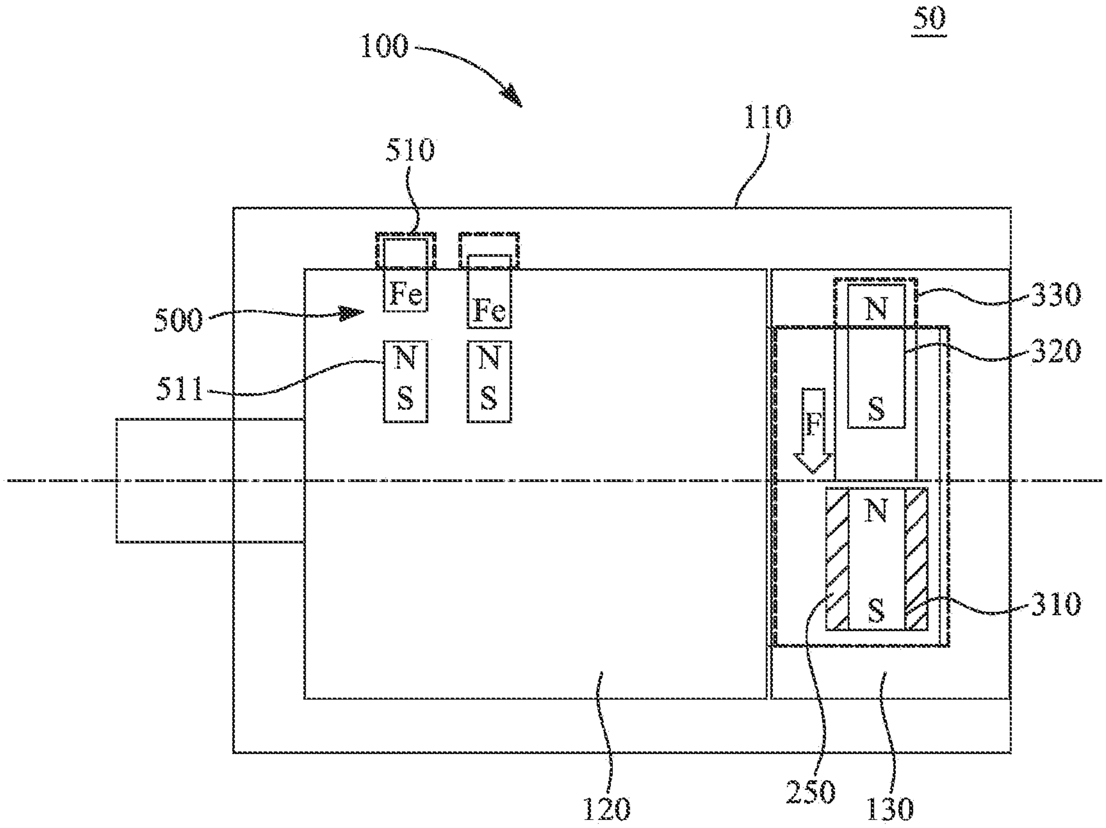
FIG. 5A demonstrates an embodiment 50 of the digital lock having blocking pins, in accordance with the invention as a block diagram.

FIG. 5A demonstrates an embodiment 50 of the digital lock 100 having blocking pins 500, in accordance with the invention as a block diagram. The digital lock 100 includes at least one blocking pin 500 configured to protrude into a notch 510 of the lock body 110 due to any of the following: when an external magnetic field is applied, when external hit or impulse is applied, and/or when the first axle 120 is turned too fast, to prevent unauthorized opening of the digital lock 100. In an example, the blocking pins 500 may be pins preferably made up of magnetic material for example Iron (Fe) configured to prevent unauthorised opening of the digital lock 100. More particularly, the blocking pins 500 are activated to prevent rotation of the first axle 120, thereby preventing unauthorised opening of the digital lock 100. In an embodiment, in the locked state 300, if the notch 330 of the second axle 130 is aligned with the hard magnet 320, and due to the external force, such as, magnetic field or external impulse, the hard magnet 320 may be protruded into the notch 330 of the second axle 130, resulting in the first axle 120 and the second axle 130 being connected with each other. Further, the blocking pins 500 are normally inserted and returned back to the first axle 120 after an external force has hit the lock, by virtue of magnetic force exerted by the hard magnet 511 or mechanical force such as spring force. That is, the magnetic or spring force moves the blocking pins both into the notch when blocking is required, and out of the notch when blocking is no longer required.

More specifically, the force applied by the hard magnet 511 or the mechanical force may be greater compared to the magnetic force applied by the external magnetic field and/or the external impulse, resulting in the blocking pins 500 returning to the first axle 120. Additionally, inertia and magnetic force of the hard magnet 511 and the blocking pins 500 are designed such that the blocking pins 500 are activated before movement of the hard magnet 320. As the blocking pins 500 are moved to a notch in the lock body 110 due to the external magnetic field and/or the external impulse, this results in prevention of unauthorised opening of the digital lock 100.

Any features of embodiment 50 may be readily combined or permuted with any of the other embodiments 10, 20, 30, 40, 51, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 5B:
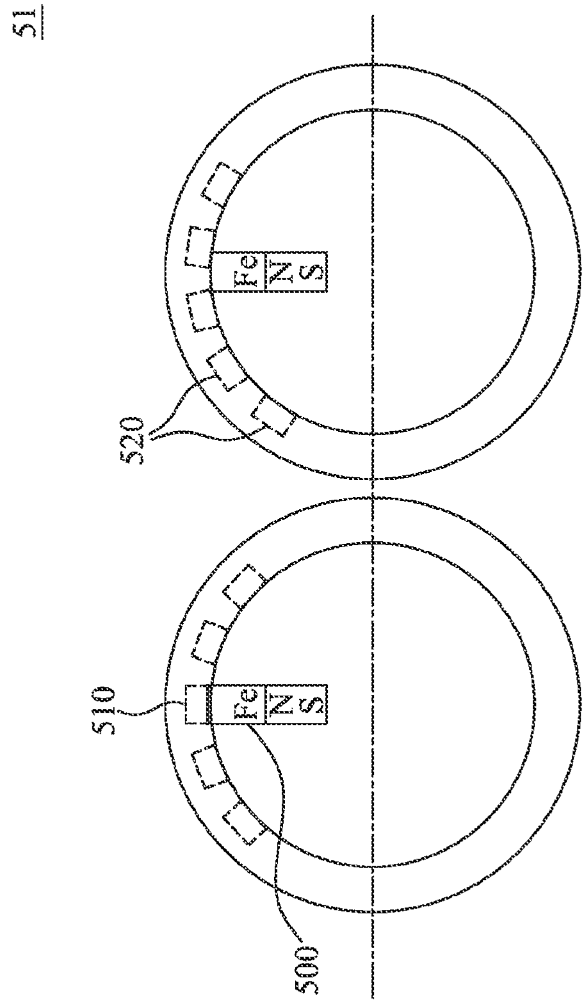
FIG. 5B demonstrates an embodiment 51 of the digital lock having the blocking pins and multiple notches in a lock body, in accordance with the invention as a block diagram.

FIG. 5B demonstrates an embodiment 51 of the digital lock 100 having the blocking pins 500 and multiple notches 520 in the lock body 110, in accordance with the invention as a block diagram. As described earlier, to prevent unauthorized opening of the digital lock 100, the digital lock 100 includes at least one blocking pin 500 configured to protrude into the notch 510 of the lock body 110 due to any of the following: when an external magnetic field is applied, when external hit or impulse is applied, and/or when the first axle 120 is turned too fast. During the unauthorised opening of the digital lock 100 the blocking pin(s) 500 may protrude from the lock body 110 from different angles. Further, the lock body 110 includes the multiple notches 520 located at various positions in the lock body 110. The blocking pin 500 may prevent unauthorised unlocking of the digital lock 100 when the blocking pin 500 is aligned with the notch 510 as shown in bottom of page configuration of FIG. 5B. The multiple notches 520 are designed such that the blocking pins 500 are configured to enter the multiple notches 520 when an unauthorised attempt is made to unlock the digital lock 100 in all angles/positions. On the contrary, the blocking pin 500 may not prevent unauthorised unlocking of the digital lock 100 when the blocking pin 500 is not aligned with the notch 520 as shown in top of page configuration of FIG. 5B.

Any features of embodiment 51 may be readily combined or permuted with any of the other embodiments 10, 20, 30, 40, 50, 60, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figures 6A, 6B, 6C:
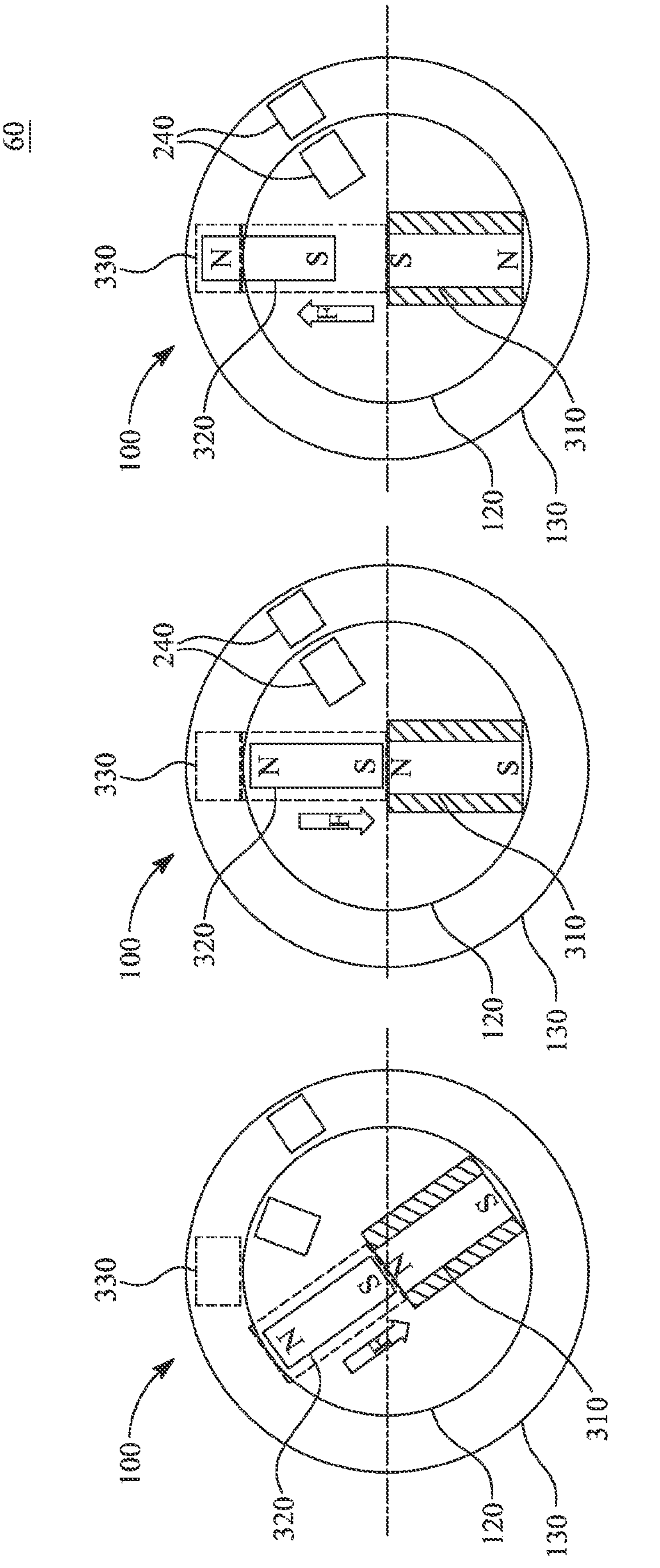
FIGS. 6A, 6B, and 6C demonstrate an embodiment 60 of the digital lock showing process of alignment of a hard magnet with a notch, in accordance with the invention as a block diagram.

FIGS. 6A, 6B, and 6C demonstrates an embodiment 60 of the digital lock 100 showing process of alignment of the hard magnet 320 with the notch 330, in accordance with the invention as a block diagram. In operation, the semi hard magnet 310 and the hard magnet 320 are inside the first axle 120. When the first axle 120 is not turned and the position sensor 240 is not in position, the notch 330 of the second axle 130 is not aligned with the hard magnet 320 to receive the hard magnet 320 as shown in FIG. 6A. In such a condition, the first axle 120 and the second axle 130 are not connected with each other. Referring to FIGS. 6B and 6C, when the first axle 120 is turned, the position sensor 240 is configured to position the notch 330 of the second axle 130 with the hard magnet 320. The hard magnet 320 is configured to enter into the notch 330 of the second axle 130 upon changing the polarity of the semi hard magnet 310. Owing to such change in polarity of the semi hard magnet 310 and as the hard magnet 320 is forced to enter the notch 330, the digital lock 100 is said to be in the openable state 400 allowing opening of the digital lock 100. In such a condition, the first axle 120 and the second axle 130 are connected with each other.

Further, the alignment of the hard magnet 320 and the notch 330 may be done by mechanical arrangement in applications where the user interface 140 and the second axle 130 is returned to the same position after opening. One example of this is a lever operated lock. In these arrangements position sensor 240 may not be needed.

Any features of embodiment 60 may be readily combined or permuted with any of the other embodiments 10, 20, 30, 40, 50, 51, 70, 80, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 7:
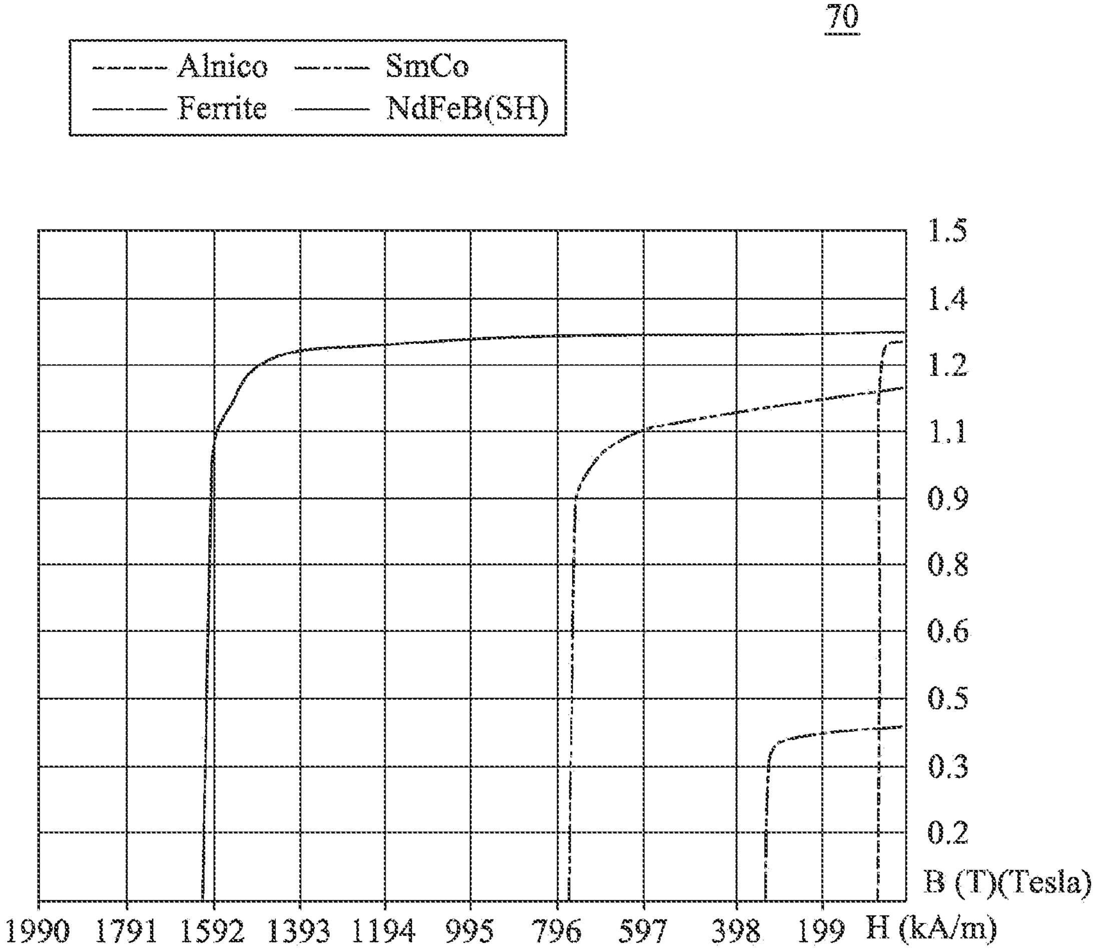
FIG. 7 demonstrates an embodiment 70 showing magnetization and magnetic materials that constitutes the digital lock, in accordance with the invention as a graphical representation.

FIG. 7 demonstrates an embodiment 70 showing magnetization and magnetic materials that constitutes the digital lock 100, in accordance with the invention as a graphical representation. As described earlier, the digital lock 100 includes the semi hard magnet 310 and the hard magnet 320 configured to open or close the digital lock 100. The semi hard magnet 310 is made up of Alnico and the hard magnet 320 is made up of SmCo. In particular, the semi hard magnet 310 is made up of iron alloys which in addition to Iron (Fe) is composed of Aluminium (Al), Nickel (Ni), and Cobalt (Co). In an example, the semi hard magnet 310 may also be made up of copper and titanium. The hard magnet 320 is made up of samarium-cobalt (SmCo), the hard magnet 320 is a permanent magnet made of an alloy of Samarium (Sm) and Cobalt (Co). The hard magnet 320 may be an object made from a material that is magnetised and creates own persistent magnetic field unlike the semi hard magnet 310 which needs to be magnetised.

Any features of embodiment 70 may be readily combined or permuted with any of the other embodiments 10, 20, 30, 40, 50, 51, 60, 80, 90, 91, 92, 93, 94, 95, 96, 97, 98, 99, 101,

102, 103, 104, 105, 106, 107, 108, 109, 116, 111, 112, 113, 114, and/or 115 in accordance with the invention.

Figures 8A, 8B, 8C:
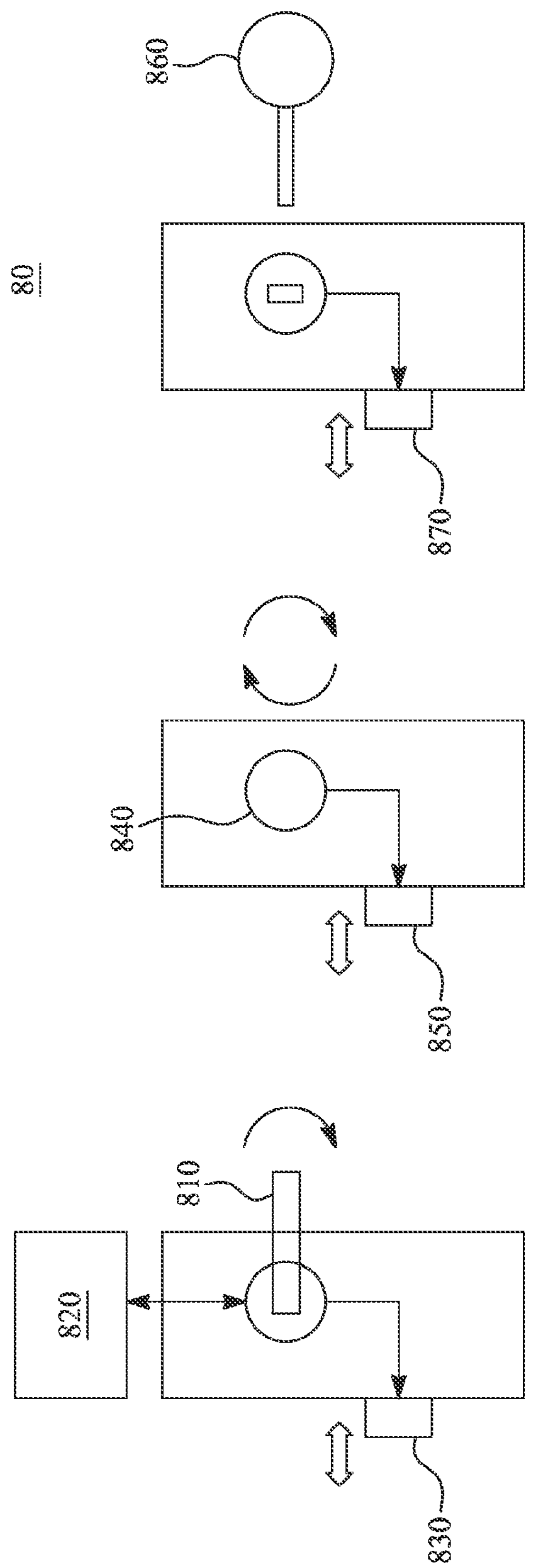
FIGS. 8A, 8B, and 8C demonstrate an embodiment 80 showing various methods of operating the digital lock, in accordance with the invention as a block diagram.

FIGS. 8A, 8B, and 8C demonstrates an embodiment 80 showing various methods of operating the digital lock 100, in accordance with the invention as a block diagram. Referring to FIG. 8A, the digital lock 100 is operated by a lever 810 which is in communication with an identification device (ID) reader 820. The ID reader 820 is configured to identify a user by any of the following: a Radio frequency identification (RFID) tag, a Near Field Communications (NFC) phone, a magnetic stripe, a fingerprint, etc. The ID reader 820 is capable of identifying the user and allowing access to the user to lock or unlock the digital lock 100 upon authenticating the user by authenticating the user from any of the above-mentioned methods of authentication. The fingerprint method of authenticating the user is performed by authenticating an impression left by the friction ridges of a finger of the user. When the impression of the finger of the user matches above a threshold with the impression stored in the database of the electronic lock module 200, a latch 830 is operated by the lever 810, thereby authenticating the user to lock or unlock the digital lock 100. In an example, the threshold may be defined as 80 percentage match of the impression of the finger. The magnetic stripe method of authenticating the user is performed by authentication the identification information stored in the magnetic stripe. When the identification information stored in the magnetic material pertaining to the user substantially matches with the identification information stored in the database of the electronic lock module 200, the latch 830 is operated by the lever 810, thereby authenticating the user to lock or unlock the digital lock 100. In one embodiment if the lock is user powered the electric power is harvested form the lever movement.

In an example, the RFID tag method of authenticating the user to lock or unlock the digital lock 100 is similar to that of the method used in the magnetic stripe. The RFID tag method of authenticating the user is performed by authentication the identification information stored in the RFID tag. When the identification information stored in the RFID tag pertaining to the user substantially matches with the identification information stored in the database of the electronic lock module 200, the latch 830 is operated by the lever 810, thereby authenticating the user to lock or unlock the digital lock 100. Further, the NFC phone method of authenticating the user is performed by authenticating a user specific information. When the user specific information matches threshold with user information stored in the database of the electronic lock module 200, the latch 830 is operated by the lever 810, thereby authenticating the user to lock or unlock the digital lock 100. In an example, the user specific information may be a digital token, user id or any other information pertaining to the user. The lever 810 has an angular movement as shown in FIG. 8A.

Referring to FIG. 8B, the digital lock 100 is operated by a knob 840 which includes an identification device (ID) reader (not shown). The ID reader is configured to identify a user by any of the following: A Radio frequency identification (RFID) tag, a Near Field Communications (NFC) phone, a magnetic stripe, a fingerprint, etc. The ID reader is capable of identifying the user and allowing access to the user to lock or unlock the digital lock 100 upon authenticating the user by authenticating the user from any of the above mentioned methods of authentication. The fingerprint method of authenticating the user is performed by authenticating an impression left by the friction ridges of a finger of the user. When the impression of the finger of the user matches above a threshold with the impression stored in the database of the electronic lock module 200, a latch 850 is operated by the knob 840, thereby allowing the user to lock or unlock the digital lock 100. In an example, the threshold may be defined as 80 percentage match of the impression of the finger. The magnetic stripe method of authenticating the user is performed by authenticating the identification information stored in the magnetic stripe. When the identification information stored in the magnetic material pertaining to the user substantially matches with the identification information stored in the database of the electronic lock module 200, the latch 850 is operated by the knob 840, thereby allowing the user to lock or unlock the digital lock 100. In some embodiments the lock is realized as a pad lock which is locked and unlocked by the digital lock 100.

In an example, the RFID tag method of authenticating the user to lock or unlock the digital lock 100 is similar to that of the method used in the magnetic stripe. The RFID tag method of authenticating the user is performed by authenticating the identification information stored in the RFID tag. When the identification information stored in the RFID tag pertaining to the user substantially matches with the identification information stored in the database of the electronic lock module 200, the latch 850 is operated by the knob 840, thereby authenticating the user to lock or unlock the digital lock 100. Further, the NFC phone method of authenticating the user is performed by authenticating a user specific information. When the user specific information matches threshold with user information stored in the database of the electronic lock module 200, the latch 850 is operated by the knob 840, thereby authenticating the user to lock or unlock the digital lock 100. In an example, the user specific information may be a digital token, user id or any other information pertaining to the user. The knob 840 has a circular movement as shown in FIG. 8B. If the lock is user powered, the electric power is harvested from the turning of the knob 840 by the user.

Referring to FIG. 8C, the digital lock 100 is operated by an electronic digital key 860. The electronic digital key 860 method of authenticating the user is performed by authenticating identification information pertaining to the electronic digital key 860. When the electronic digital key 860 inserted by the user matches with identification information pertaining to the electronic digital key 860 stored in the database of the electronic lock module 200, a latch 870 is operated by the electronic digital key 860, thereby authenticating the user to lock or unlock the digital lock 100. The digital lock 100 and digital key 860 may abide to the AES standard as said before. The digital lock 100 and the digital key 860 operate via electromagnetic contact, or wirelessly over the air.

In some embodiments the mechanical energy produced by the human user to move the digital key 860 in the digital lock is collected to power the digital lock 100, or digital key 860.

Any features of embodiment 80 may be readily combined or permuted with any of the other embodiments 10, 20, 30, 40, 50, 51, 60, 70, 90, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 9:
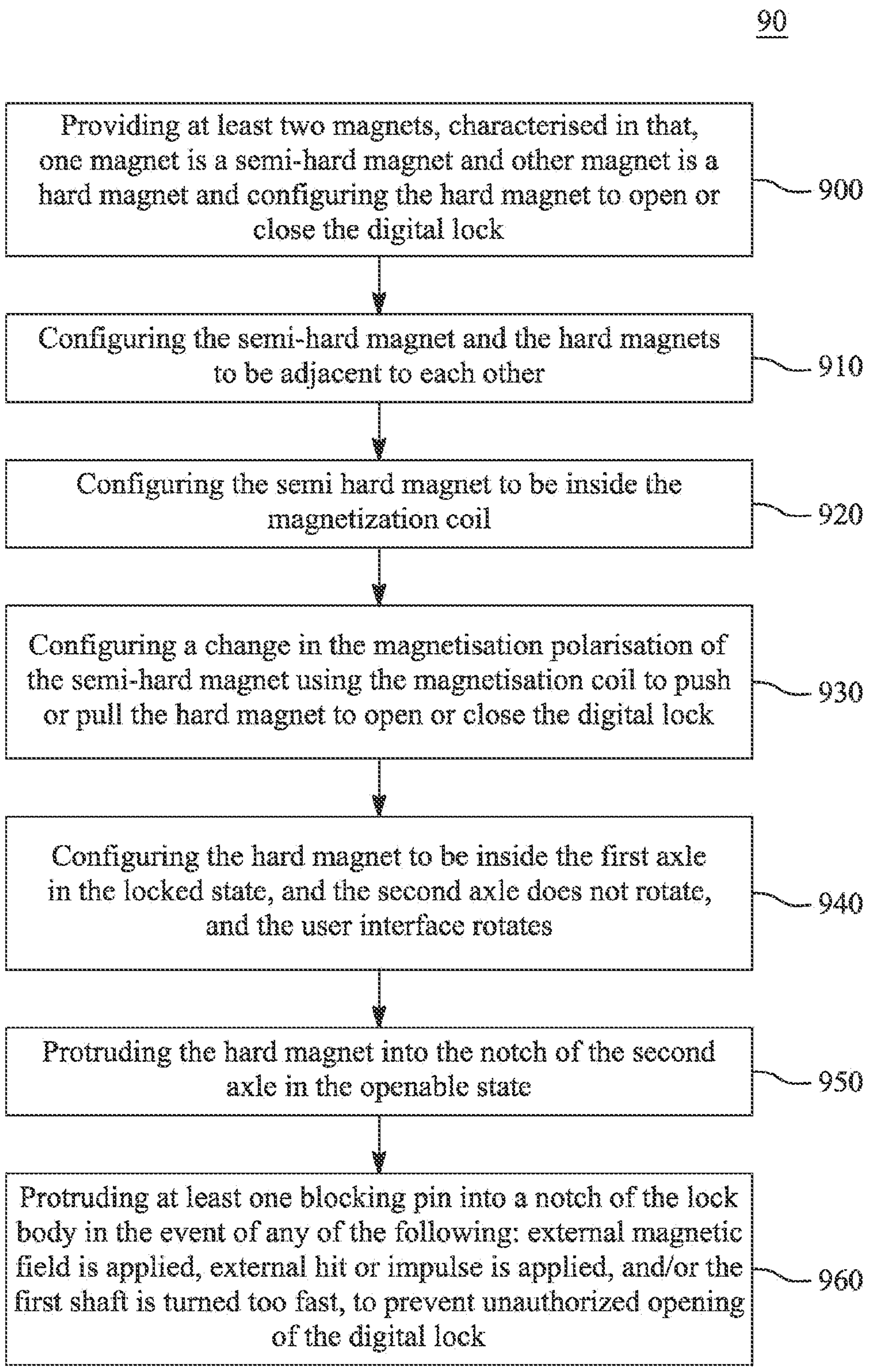
FIG. 9 demonstrates an embodiment 90 of a method for controlling the digital lock, in accordance with the invention as a flow diagram.

FIG. 9 demonstrates an embodiment 90 of a method for controlling the digital lock 100, in accordance with the invention as a flow diagram. The method could be implemented in a system identical or similar to embodiments 10, 20, 30, 40, 50, 60, 70, and 80 in FIGS. 1, 2, 3, 4, 5, 6, 7, and 8 for example, as discussed in the other parts of the description.

In phase 900, at least two magnets are provided in the digital lock 100. One magnet is the semi hard magnet 310 and the other magnet is the hard magnet 320. The hard magnet 320 is configured to open or close the digital lock 100. As described with reference to FIG. 1, the digital lock 100 includes the first axle 120, the second axle 130, and the user interface 140 attached to the outer surface 150 of the lock body 110. The user interface 140 is connected to the first axle 120. The semi hard magnet 310 and the hard magnet 320 are located inside the first axle 120.

In phase 910, the semi hard magnet 310 and the hard magnet 320 are configured to be placed adjacent to each other. In the illustrated embodiment, as shown in FIGS. 3, 4, and 5 the hard magnet 320 is placed above the semi hard magnet 310.

In phase 920, the semi hard magnet 310 is configured to be inside the magnetisation coil 250. When required, the magnetisation coil 250 is responsible for changing polarity of the semi hard magnet 310.

In phase 930, the change in the polarity of the semi-hard magnet 310 is configured to push or pull the hard magnet 320 to open or close the digital lock 100.

In phase 940, the hard magnet 320 is configured to be inside the first axle in the locked state 300. In such a condition, the first axle 120 and the second axle 130 are not connected to each other. Thus, the second axle 130 does not rotate due to the movement of the first axle 120. Further, owing to the connection between the first axle 120 and the user interface 140, when the first axle 120 is rotated, the user interface 140 also rotates in a direction similar to that of the first axle 120. When the rest state of the digital lock 100 is to be in the locked state 300, the digital lock 100 is configured to return to the locked state 300.

In phase 950, the hard magnet 320 is protruded into the notch 330 of the second axle 130 in the openable state 400. The position sensor 240 is configured to position the notch 330 of the second axle 130 in place for the hard magnet 320 to enter the notch 330. When the rest state of the digital lock 100 is to be in the openable state 400, the digital lock 100 is configured to return to the openable state 400. Further, when the digital lock 100 is in the openable state 400, the first axle 120 and the second axle 130 are connected with each other. In such a condition, as the hard magnet 320 is protruded into the notch 330 of the second axle 130, the user may be able to open the digital lock 100, as the digital lock 100 is in the openable state 400.

The protrusion of the hard magnet 320 typically causes wear and tear on the components over time. To increase the durability of the system, the hard magnet 320 may be realised inside a titanium cover in some embodiments. For example, the SmCo hard magnet can be placed inside a titanium casing. The casing or cover preferably increases the mechanical hardness and strength of the hard magnet 320 to reduce the effects of wear and tear over time. The casing or cover is preferably also made of light material by weight to limit the aggregate weight of the hard magnet 320. Other materials, not only titanium, may also be used to realise the casing or cover in accordance with the invention.

In phase 960, the blocking pin 500 is protruded into the notch 330 of the lock body 110 due to any of the following: when an external magnetic field is applied, when external hit or impulse is applied, and/or when the first axle 120 is turned too fast, to prevent unauthorized opening of the digital lock 100.

Further, the digital lock 100 is configured to be a self-powered lock powered by any of the following: NFC, solar panel, user-powered, power supply and/or battery. As described with reference to FIG. 2, the digital lock 100 includes the electronic lock module 200 connected to the identification device 210 via the communication bus 220. The communication bus 220 is configured to transfer data between the identification device 210 and the electronic lock module 200. The identification device 210 is configured to identify a user by any of the following: key tag, fingerprint, magnetic stripe, and/or Near Field Communication (NFC) device, which may be a smartphone.

Any features of embodiment 90 may be readily combined or permuted with any of the other embodiments 10, 20, 30, 40, 50, 51, 60, 70, 80, 91, 92, 93, 94, 95, 96, 97, 98, 99, 101, 102, 103, 104, 105, 106, 107, 108, 109, 116, 111, 112, 113, 114, and/or 115 in accordance with the invention.

Figure 10:
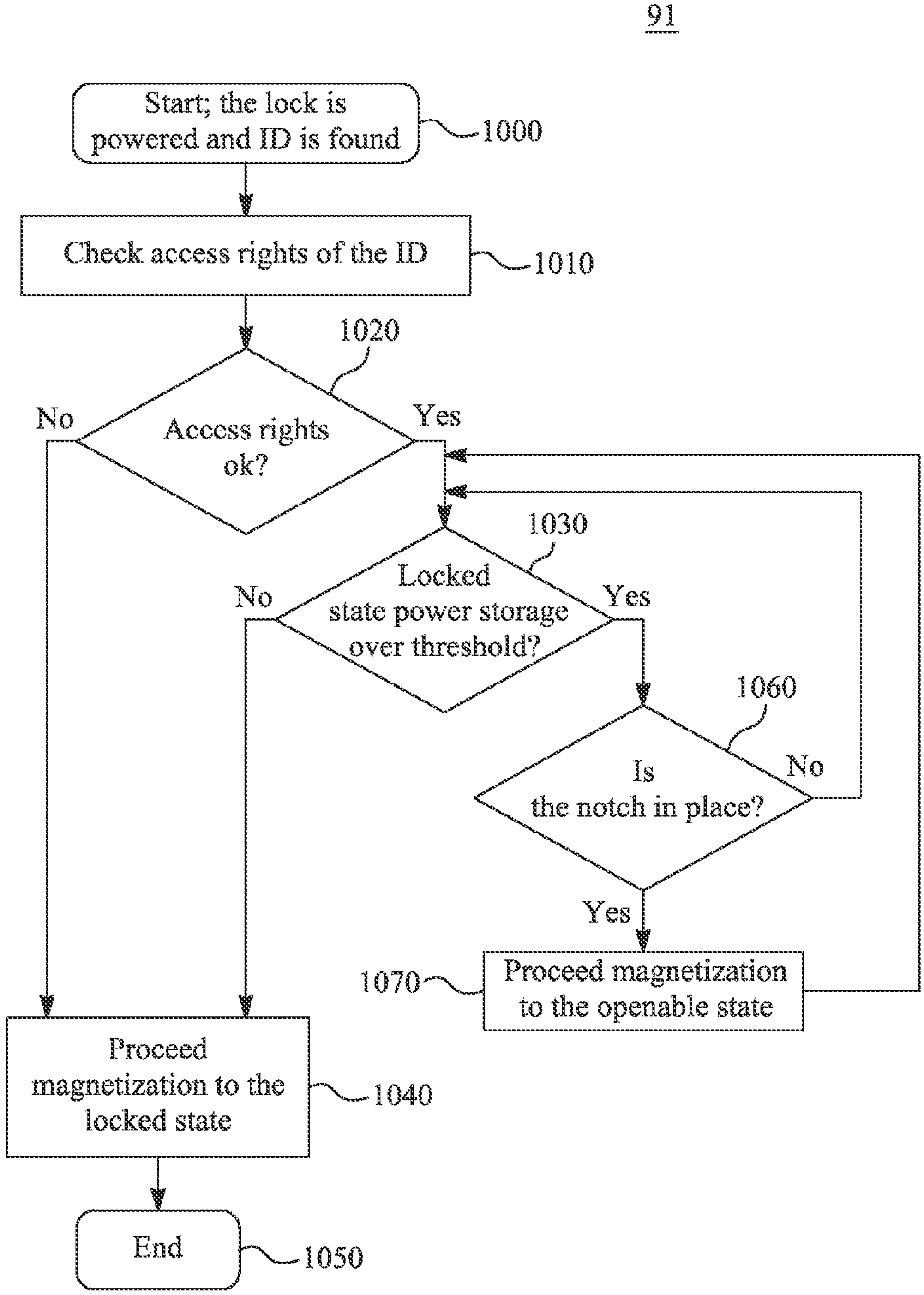
FIG. 10 demonstrates an embodiment 91 of a method for magnetizing the digital lock, in accordance with the invention as a flow diagram.

FIG. 10 demonstrates an embodiment 91 of a method for magnetizing the digital lock 100, in accordance with the invention as a flow diagram. The method could be implemented in a system identical or similar to embodiments 10, 20, 30, 40, 50, 60, 70, and 80 in FIGS. 1, 2, 3, 4, 5, 6, 7, and 8 for example, as discussed in the other parts of the description.

In phase 1000, the digital lock 100 is self-powered. In particular, the digital lock 100 is powered by any of the following: NFC, solar panel, power supply and/or battery as explained in the earlier embodiments.

The identification device 210 is configured to identify the user by any of the following: key tag, fingerprint, magnetic stripe, and/or Near Field Communication (NFC) smartphone.

In phase 1010, the identification device 210 checks access rights of the identification information pertaining to the user.

In phase 1020, if the access rights of the identification information pertaining to the user is correct, then a check for threshold of the locked state 300 power storage is carried out in phase 1030. On the contrary, if the access rights of the identification information pertaining to the user is incorrect, in phase 1040, magnetization to the locked state 300 is performed.

In phase 1030, upon checking the threshold of the locked state 300 power storage, if the locked state 300 power storage is beyond the threshold, then a check for positioning of the notch 330 of the second axle 130 is performed in phase 1050. If the locked state 300 power storage is less than the threshold, then magnetization to the locked state 300 is performed in phase 1040. After the magnetization to the locked state 300, in the phase 1040, the process magnetizing the digital lock 100 is completed in phase 1050.

In phase 1060, upon checking positioning of the notch 330 of the second axle 130, if the notch 330 of the second axle 130 is in place, then magnetization to the openable state 400 is performed in phase 1070. If the notch 330 of the second axle 130 is not in position, then again the check for the threshold of the locked state 300 power storage is carried out in phase 1030.

Any features of embodiment 91 may be readily combined or permuted with any of the other embodiments 10, 20, 30, 40, 50, 51, 60, 70, 80, 90, 92, 93, 94, 95, 96, 97, 98, 99, 101, 102, 103, 104, 105, 106, 107, 108, 109, 116, 111, 112, 113, 114, and/or 115 in accordance with the invention.

Figure 11:
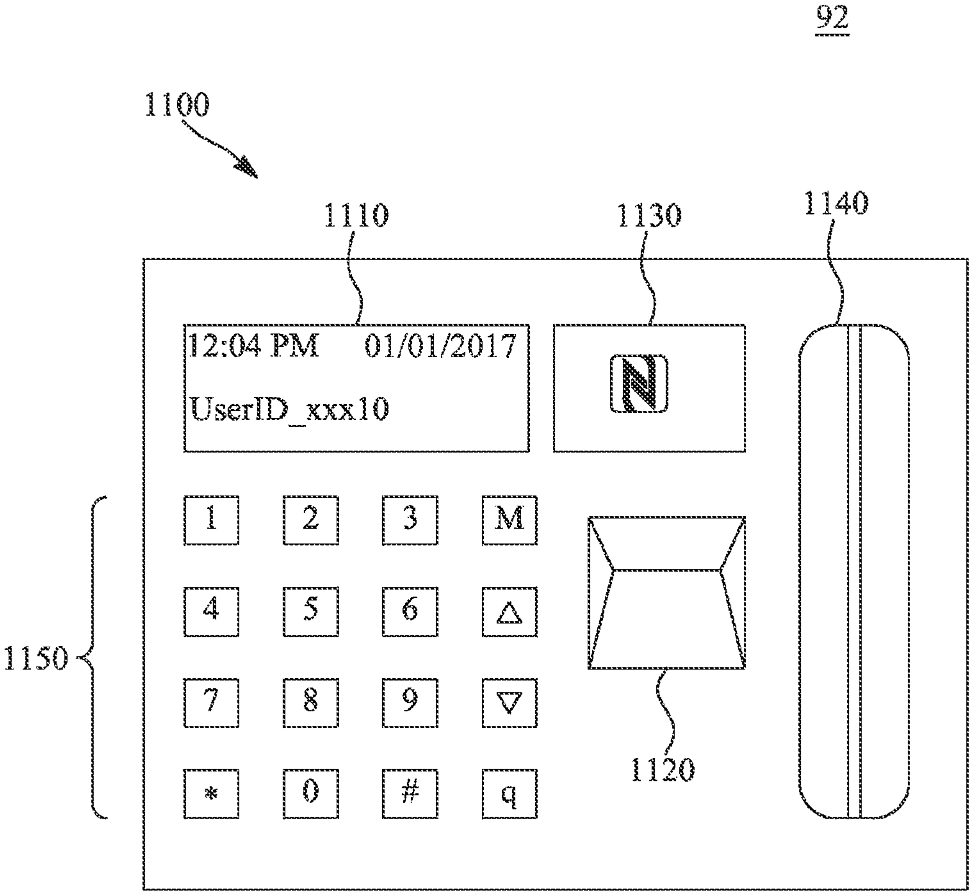
FIG. 11 demonstrates an embodiment 92 of a software program product configured to control the digital lock, in accordance with the invention as a screen shot diagram.

FIG. 11 demonstrates an embodiment 92 of a software program product 1100 configured to control the digital lock 100, in accordance with the invention as a screen shot diagram. The software program product 1100 controls the digital lock 100 including at least two magnets. One magnet is the semi hard magnet 310 and the other magnet is the hard magnet 310 configured to open or close the digital lock 100. The software program product 1100 includes a screen interface 1110 to display the status of the digital lock 100. More particularly, the locked state 300 and the openable state 400 is displayed on the screen interface 1110. Further, the software program product includes a fingerprint scanner 1120, a NFC reader 1130, a magnetic stripe access 1140, and/or a keypad access 1150. For the sake of brevity, implementation and authentication of the user using the fingerprint scanner 1120, the NFC reader 1130, the magnetic stripe access 1140, and/or the keypad access 1150 is explained with reference to the above figures. In an example, although, the keypad access 1150 is illustrated, it may be understood that the keypad access 1150 may be replaced with a touchpad access within the screen interface 1110 of the software program product 1100. In another example, although, the fingerprint scanner 1120 is illustrated, it may be understood that the fingerprint scanner 1120 may be replaced with an iris scanner in the software program product 1100.

Any features of embodiment 91 may be readily combined or permuted with any of the other embodiments 10, 20, 30, 40, 50, 51, 60, 70, 80, 90, 92, 93, 94, 95, 96, 97, 98, 99, 101, 102, 103, 104, 105, 106, 107, 108, 109, 116, 111, 112, 113, 114, and/or 115 in accordance with the invention.

Figure 12:
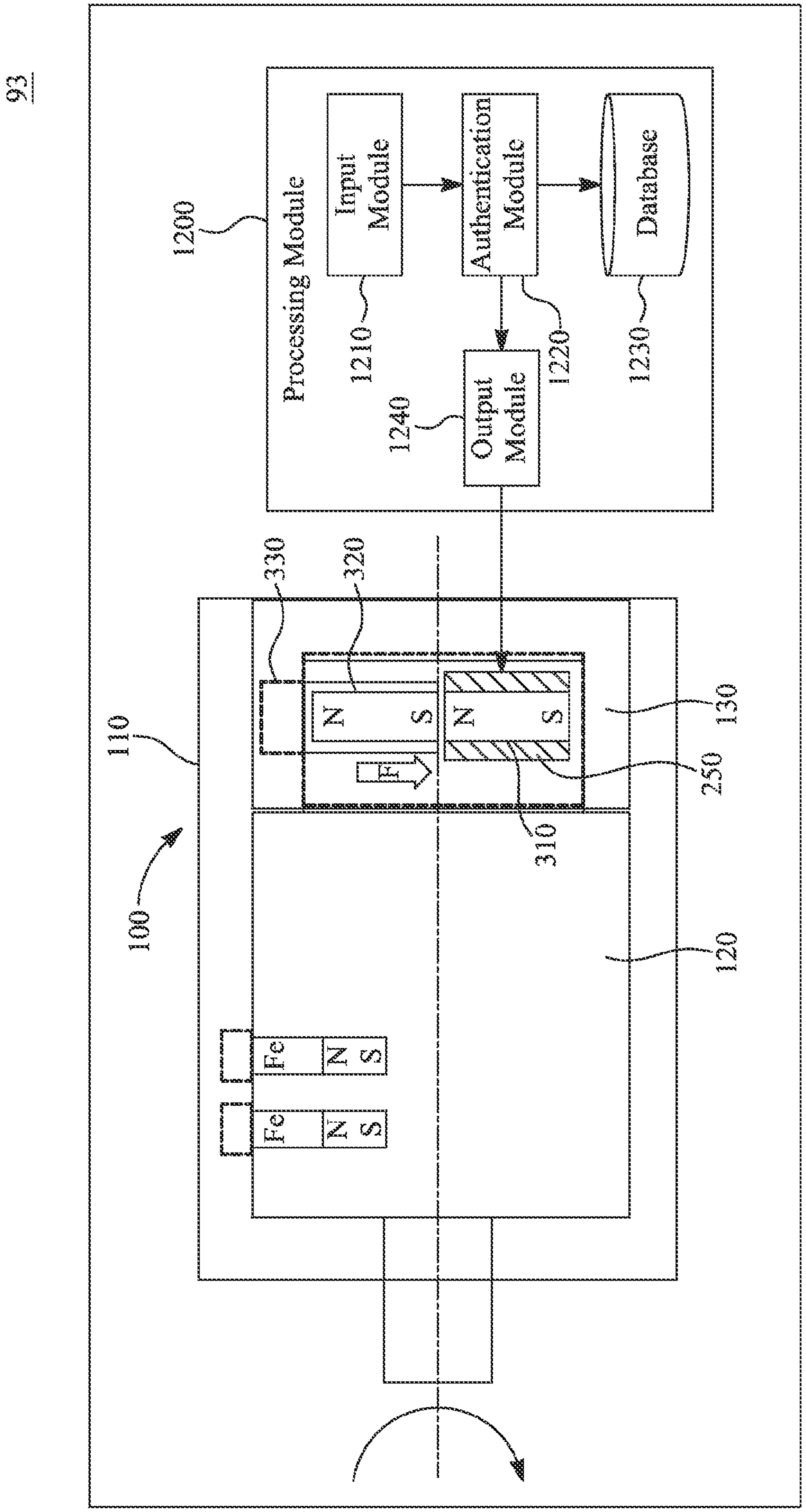
FIG. 12 demonstrates an embodiment 93 of the software program product, in accordance with the invention as a screen shot diagram.

FIG. 12 demonstrates an embodiment 93 of the software program product 1100, in accordance with the invention as a screen shot diagram. This software product may abide to the AES standard. The software program product 1100 as discussed herein is defined to encompass program instructions, processing hardware, necessary operating systems, device drivers, electronic circuits, the first axle 120, the second axle 130, the semi hard magnet 310, the hard magnet 320, and/or the blocking pin 500 for the operation of the digital lock. The software program product 1100 is elaborated below.

The software program product 1100 includes a processing module 1200. The processing module 1200 includes an input module 1210 configured to receive an input indicative of identification information pertaining to the user. The method of inputting the identification information, by the user may be done by any of the following: the keypad access 1150, fingerprint scanner 1120, magnetic stripe access 1140, and/or Near Field Communication (NFC) reader 1130. The processing module 1200 further includes an authentication module 1220 in communication with the input module 1210. The authentication module 1220 is configured to authenticate the input received by the user interface 140 and is responsible for providing access to the user to lock or unlock the digital lock 100. Also, the authentication module 1220 is communication with a database 1230 of the software program product 1100. The database 1230 is configured to store identification information of one or more users. The authentication module 1220 authenticates the identification information inputted by the user with the identification information already stored in the database 1230 of the software program product 1100. Authenticated identification information from the authentication module 1220 is communicated to an output module 1240 of the software program product 1100. The output module 1240 is in communication with the digital lock 100. The output module 1240 is configured to control a power source to power the magnetization coil 250 to change the magnetization polarization of the semi hard magnet 310 in response to successful identification of the user, and configured to control the hard magnet 320 to open or close the digital lock 100. Thus, the identification information communicated by the authentication module 1220 to the output module 1240 is responsible for allowing the user to lock or unlock the digital lock 100.

As described earlier, the software program product 1100 controls the digital lock 100 having the semi hard magnet 310 and the hard magnet 320. The semi hard magnet 310 is located inside the magnetization coil 250 and the semi hard magnet 310 and the hard magnet 320 are placed adjacent to each other and located inside the first axle 120. The digital lock 100 is a self-powered lock powered by any of the following: NFC field, solar panel, power supply and/or battery. Further, the digital lock 100 includes the first axle 120, the second axle 130, and the user interface 140. The user interface 140 is attached to the outer surface 150 of the lock body 110. The user interface 140 is further connected to the first axle 120. The digital lock 100 includes the electronic lock module 200 that is connected to the identification device 210 via the communication bus 220. The identification device 210 is configured to identify the user by any of the following: electronic key, tag, key tag, fingerprint, magnetic stripe, NFC device.

Any features of embodiment 93 may be readily combined or permuted with any of the other embodiments 10, 20, 30, 40, 50, 51, 60, 70, 80, 90, 91, 92, 94, 95, 96, 97, 98, 99, 101, 102, 103, 104, 105, 106, 107, 108, 109, 116, 111, 112, 113, 114, and/or 115 in accordance with the invention.

Figure 13:
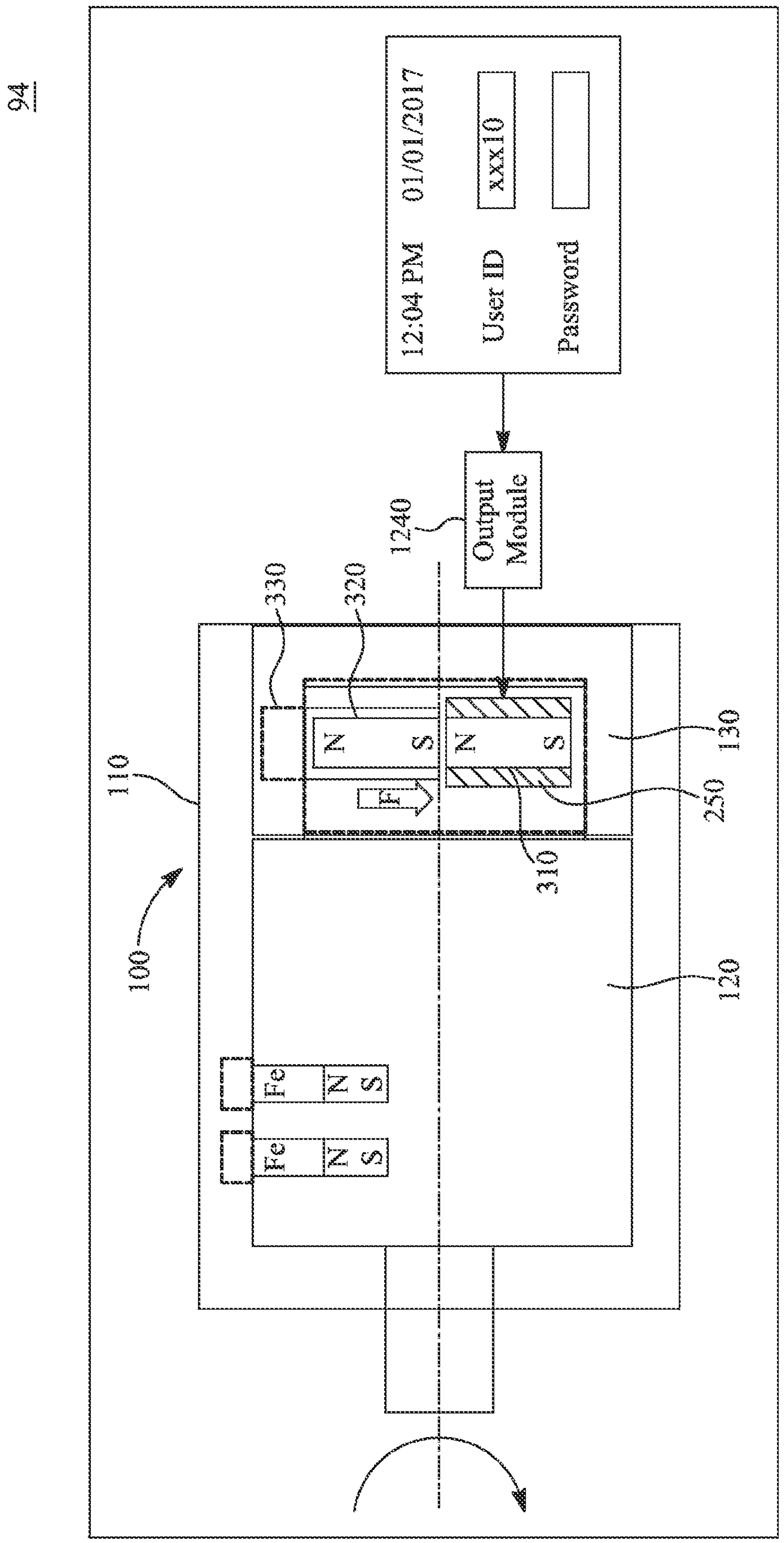
FIG. 13 demonstrates an embodiment 94 of the software program product, in accordance with the invention as a screen shot diagram.

FIG. 13 demonstrates an embodiment 94 of the software program product 1100, in accordance with the invention as a screen shot diagram. In the illustrated embodiment 94, a process of inputting the identification information pertaining to the user is displayed. The screen shot displays date and time. In the illustrated embodiment, an option for inputting the user id and passcode is displayed in the screen shot. Although, the option for inputting the user id and passcode is displayed to the user, it may be understood that an option of inputting the identification information by any of the following: user id and passcode, the fingerprint scanner 1120, the NFC reader 1130, electronic key, the magnetic stripe access 1140, and/or the keypad access 1150 pertaining to the user may be displayed to the user.

Any features of embodiment 94 may be readily combined or permuted with any of the other embodiments 10, 20, 30, 40, 50, 51, 60, 70, 80, 90, 91, 92, 93, 95, 96, 97, 98, 99, 101, 102, 103, 104, 105, 106, 107, 108, 109, 116, 111, 112, 113, 114, and/or 115 in accordance with the invention.

Figure 14:
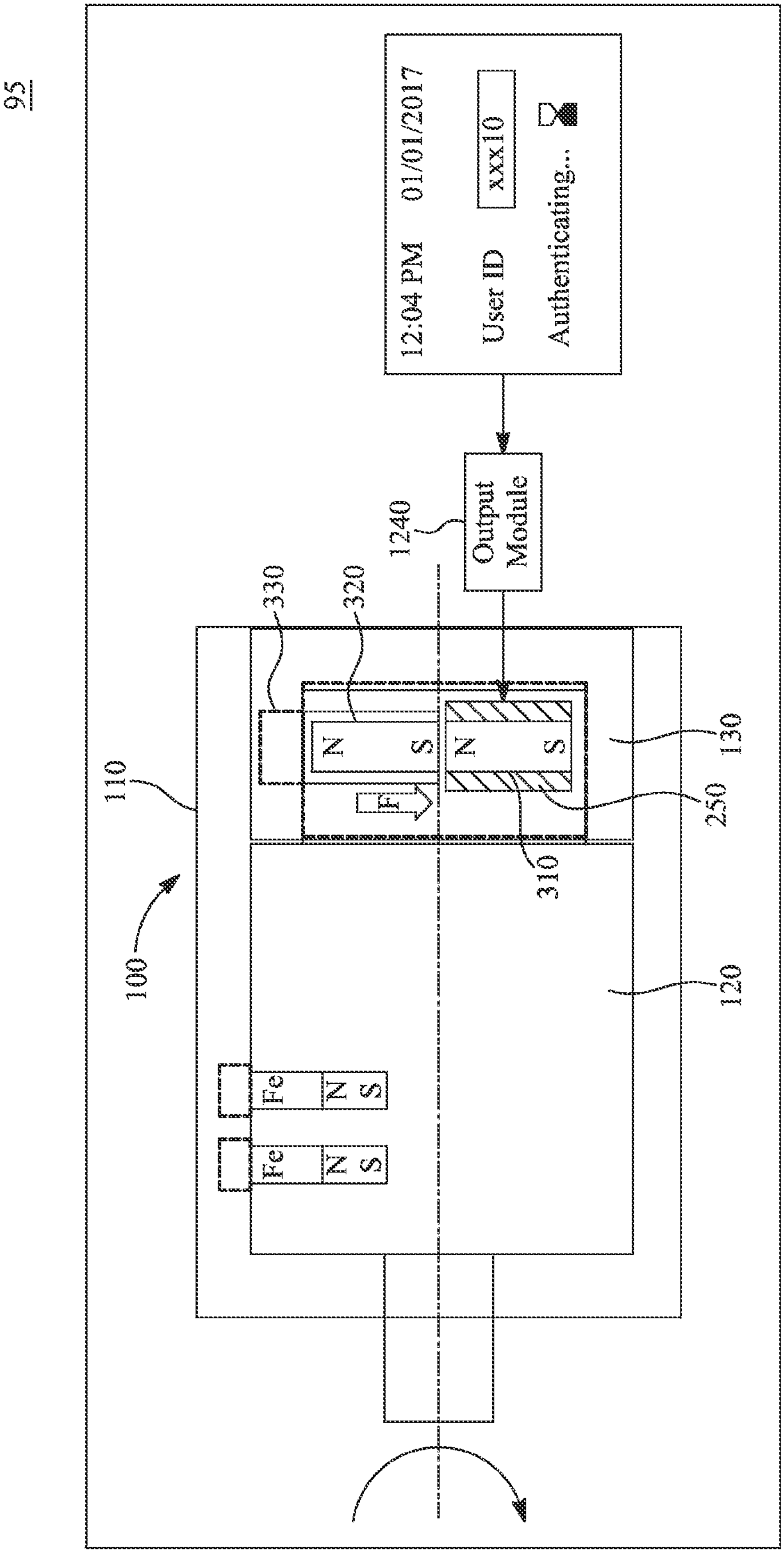
FIG. 14 demonstrates an embodiment 95 of the software program product, in accordance with the invention as a screen shot diagram.

FIG. 14 demonstrates an embodiment 95 of the software program product 1100, in accordance with the invention as a screen shot diagram. In the illustrated embodiment 95, a process of authentication of the identification information pertaining to the user is displayed. The process of authentication upon the user inputting the user id and passcode pertaining to the user is displayed to the user as shown in the screen shot. The identification information inputted by the user is then received by the authentication module 1220 which compares the inputted identification information with the identification information stored in the database 1230. During this process, the digital lock 100 is in the locked state 300. When the rest state of the digital lock 100 is in the locked state 300, the digital lock 100 is configured to return to the locked state 300. In the locked state 300, the hard magnet 320 is configured to be inside the first axle 120, the second axle 130 does not rotate, and the user interface 140 rotates.

Any features of embodiment 95 may be readily combined or permuted with any of the other embodiments 10, 20, 30, 40, 50, 51, 60, 70, 80, 90, 91, 92, 93, 94, 96, 97, 98, 99, 101, 102, 103, 104, 105, 106, 107, 108, 109, 116, 111, 112, 113, 114, and/or 115 in accordance with the invention.

Figure 15:
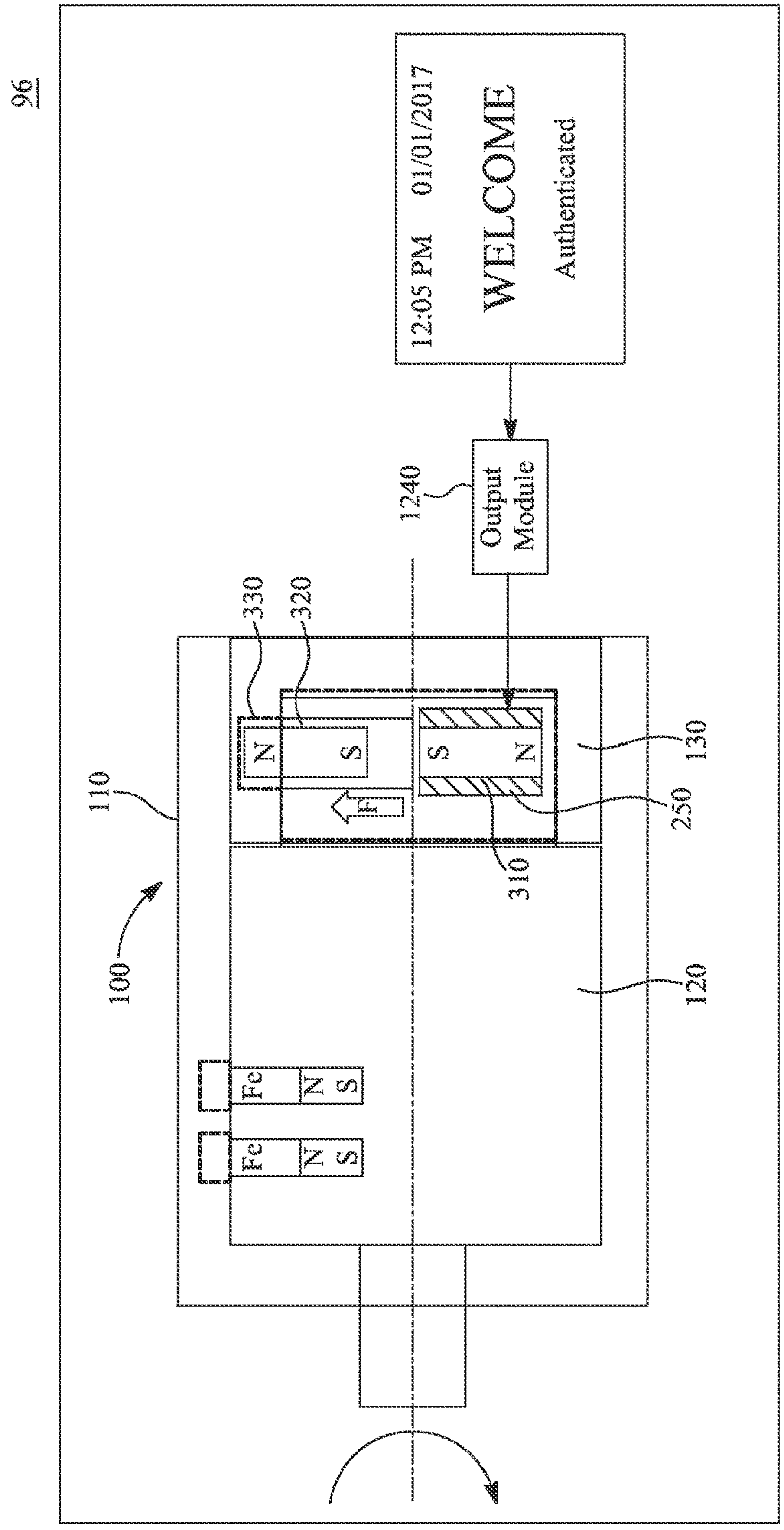
FIG. 15 demonstrates an embodiment 96 of the software program product, in accordance with the invention as a screen shot diagram.

FIG. 15 demonstrates an embodiment 96 of the software program product 1100, in accordance with the invention as a screen shot diagram. In the illustrated embodiment 96, a screen shot of the user being authenticated is displayed. The user is authenticated to unlock the digital lock 100 when the user id and passcode inputted by the user matches with the user id and passcode stored in the database 1230. The authenticated information is then communicated to the output module 1240 which sends a signal to the digital lock 100 to be in the openable state 400 as shown. In addition, an authentication confirmation notification to the user is provided. The notification may be any of the following: an audio notification, a video notification, a multimedia notification, and/or a text notification. In an example, the text notification may be provided on a phone. The software program product 1100 is configured to change the polarity of the semi hard magnet 310 to push or pull the hard magnet 320 to open the digital lock 100. More particularly, the position sensor 240 is configured to position the notch 330 of the second axle 130 in place for the hard magnet 320 to enter the notch 330. In the openable state 400, the hard magnet 320 is protruded into the notch 330 of the second axle 130. When the rest state of the digital lock 100 is in the openable state 400, the digital lock 100 is configured to return to the openable state 400.

In some embodiments the time stamps of lock openings and lock closings are stored into the database 1230 or some other memory medium.

Any features of embodiment 96 may be readily combined or permuted with any of the other embodiments 10, 20, 30, 40, 50, 51, 60, 70, 80, 90, 91, 92, 93, 94, 95, 97, 98, 99, 101, 102, 103, 104, 105, 106, 107, 108, 109, 116, 111, 112, 113, 114, and/or 115 in accordance with the invention.

Figure 16:
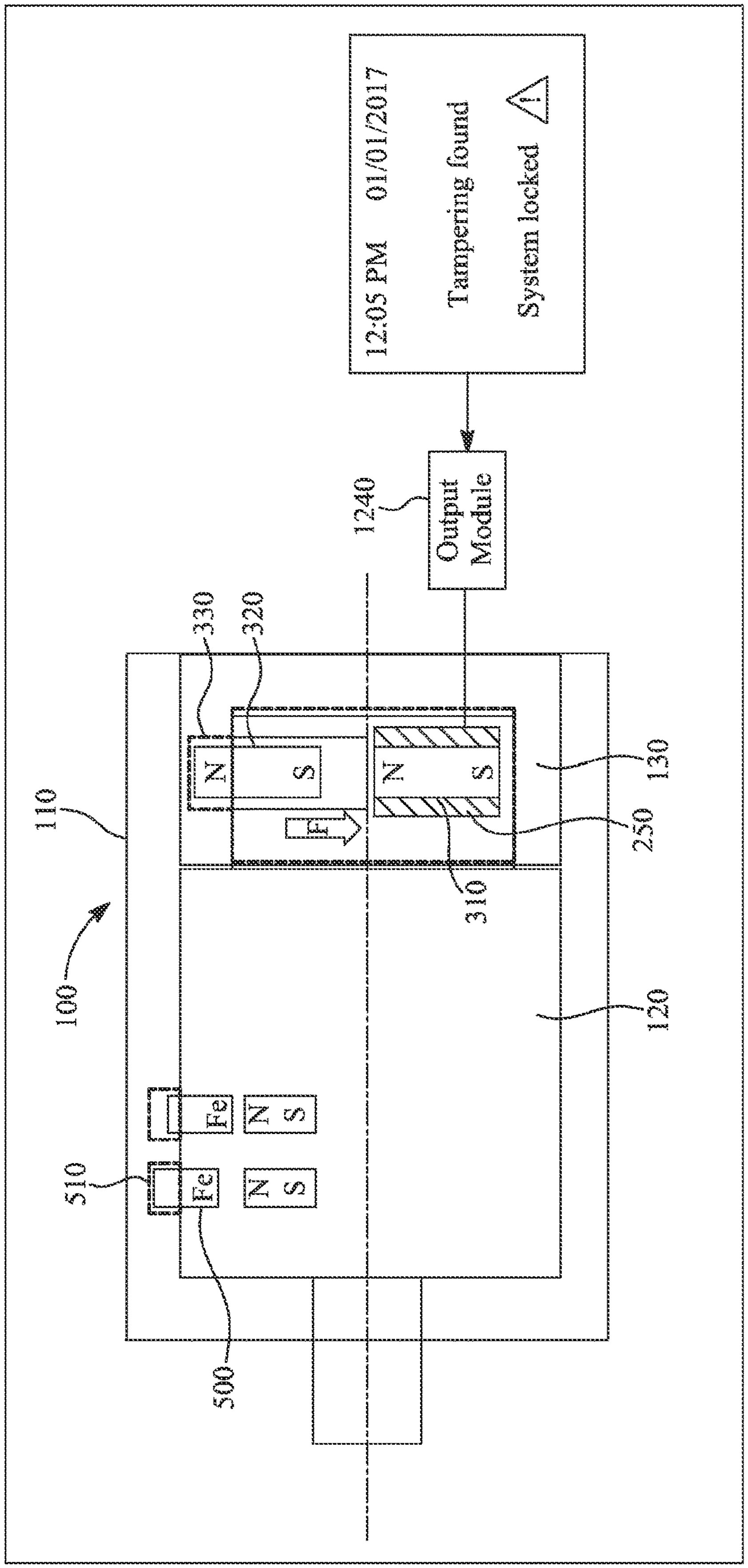
FIG. 16 demonstrates an embodiment 97 of the software program product, in accordance with the invention as a screen shot diagram.

FIG. 16 demonstrates an embodiment 97 of the software program product 1100, in accordance with the invention as a screen shot diagram. In the illustrated embodiment 96, a screen shot of the digital lock 100 being tampered is displayed. In particular, tampering of the digital lock 100 happens due to any of the following: when an external magnetic field is applied, when an external hit or impulse is applied, and/or when the first axle 130 is turned too fast. When the digital lock 100 is tampered, the blocking pin (s) 500 are activated. The blocking pin 500 is configured to protrude into multiple notches 520 of the lock body 110. If the user is found to be tampering the digital lock 100, the user id along with the time stamp would be recorded in the database 1230.

Any features of embodiment 97 may be readily combined or permuted with any of the other embodiments 10, 20, 30, 40, 50, 51, 60, 70, 80, 90, 91, 92, 93, 94, 95, 96, 98, 99, 101, 102, 103, 104, 105, 106, 107, 108, 109, 116, 111, 112, 113, 114, and/or 115 in accordance with the invention.

Figure 17:
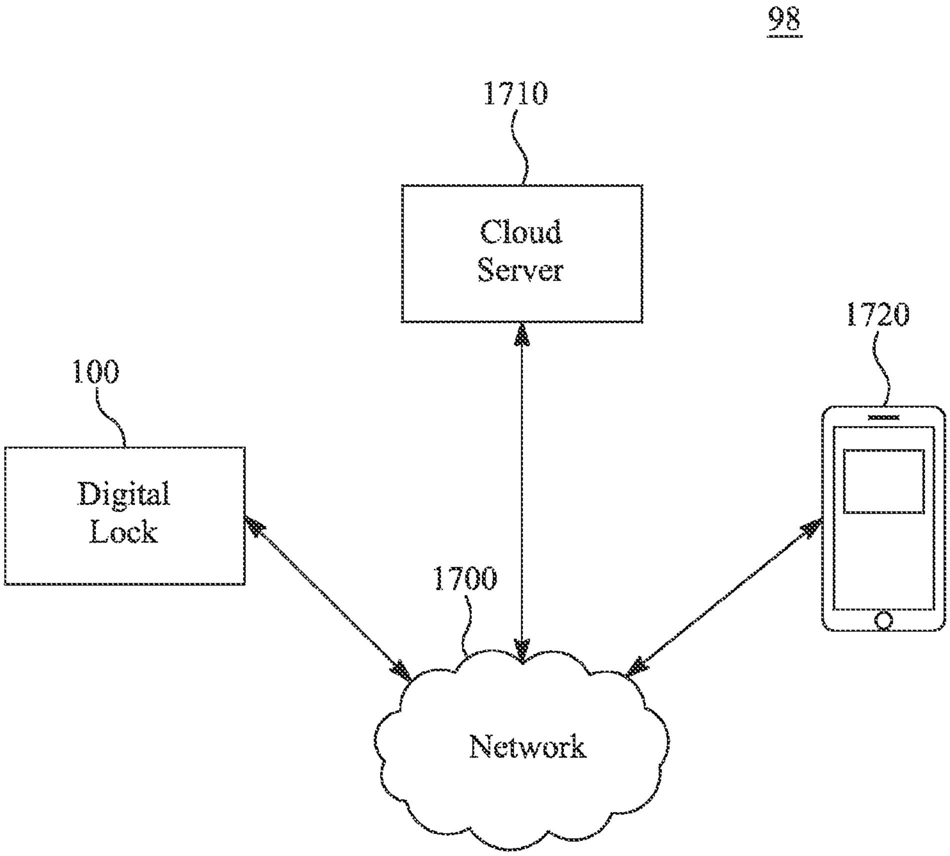
FIG. 17 demonstrates an embodiment 98 of the software program product, in accordance with the invention as a block diagram.

FIG. 17 demonstrates an embodiment 98 of the software program product 1100, in accordance with the invention as a block diagram. In the illustrated embodiment 98, the digital lock 100 is in communication with a network 1700, a cloud server 1710, and a user terminal device 1720. The digital lock 100 and the user terminal device 1720 communicate with the cloud server 1710 via the network 1700. The network 1700 used for the communication in embodiments of the invention is the wireless or wireline Internet or the telephony network, which is typically a cellular network such as UMTS (Universal Mobile Telecommunication System), GSM (Global System for Mobile Telecommunications), GPRS (General Packet Radio Service), CDMA (Code Division Multiple Access), 3G, 4G, Wi-Fi and/or WCDMA (Wideband Code Division Multiple Access)-network.

The user terminal device 1720 is in communication with the network 1700 and the cloud server 1710. The user terminal device 1720 may be configured as a mobile terminal computer, typically a smartphone and/or a tablet that is used to receive identification information pertaining to the user. The user terminal device 1720 is typically a mobile smartphone, such as iOS, Android or a Windows Phone smartphone. However, it is also possible that the user terminal device 1720 is a mobile station, mobile phone or a computer, such as a PC-computer, Apple Macintosh computer, PDA device (Personal Digital Assistant), or UMTS (Universal Mobile Telecommunication System), GSM (Global System for Mobile Telecommunications), WAP (Wireless Application Protocol), Teldesic, Inmarsat-, Iridium-, GPRS-(General Packet Radio Service), CDMA (Code Division Multiple Access), GPS (Global Positioning System), 3G, 4G, Bluetooth, WLAN (Wireless Local Area Network), Wi-Fi and/or WCDMA (Wideband Code Division Multiple Access) mobile station. Sometimes in some embodiments the user terminal device 1720 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The user terminal device 1720 provides an application (not shown) to allow the user to input identification information pertaining to the user to be authenticated with the cloud server 1710 to enable locking and/or unlocking of the digital lock 100. Preferably the user downloads the application from the Internet, or from various app stores that are available from Google, Apple, Facebook and/or Microsoft. For example, in some embodiments an iPhone user with a Facebook application on his phone will download the application that is compatible with both the Apple and Facebook developer requirements. Similarly, a customized application can be produced for other different handsets.

In an example, the cloud server 1710 may comprise a plurality of servers. In an example implementation, the cloud server 1710 may be any type of a database server, a file server, a web server, an application server, etc., configured to store identification information related to the user. In another example implementation, the cloud server 1710 may comprise a plurality of databases for storing the data files. The databases may be, for example, a structured query language (SQL) database, a NoSQL database such as the Microsoft® SQL Server, the Oracle® servers, the MySQL® database, etc. The cloud server 1710 may be deployed in a cloud environment managed by a cloud storage service provider, and the databases may be configured as cloud-based databases implemented in the cloud environment.

The cloud server 1710 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realise the cloud network used by the cloud server 1710 of embodiments of the invention. The cloud server 1710 can be purchased as a separate solution from known vendors such as Microsoft and Amazon and HP (Hewlett-Packard). The cloud server 1710 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like.

In operation, the user enters the identification information in the user terminal device 1720. In an example, the identification information may be fingerprint, passcode, and/or personal details associated with the user. The identification information entered by the user may be through any of the following: the keypad access 1150, fingerprint scanner 1120, and/or Near Field Communication (NFC) reader 1130. The identification information entered by the user is communicated to the cloud server 1710 through the network 1700. The cloud server 1710 authenticates the entered identification information by comparing with the identification information stored in the database of the cloud server 1710. A notification associated with the authentication is communicated through the network 1700 and displayed on the application in the user terminal device 1720. In an example, the notification may be an alert indicative of success or failure of authentication. In some implementation, the notification may be any of the following: an audio notification, a video notification, a multimedia notification, and/or a text notification. If there is a mismatch of the identification information, the digital lock 100 is not opened through the application. If the identification information entered by the user matches with the identification information stored in the database of the cloud server 1710, the digital lock 100 is opened through the application in the user terminal device 1720. In some embodiments the power from the user terminal device 1720 is used to power the digital lock.

Any features of embodiment 98 may be readily combined or permuted with any of the other embodiments 10, 20, 30, 40, 50, 51, 60, 70, 80, 90, 91, 92, 93, 94, 95, 96, 97, 99, 101, 102, 103, 104, 105, 106, 107, 108, 109, 116, 111, 112, 113, 114, and/or 115 in accordance with the invention.

Figure 18:
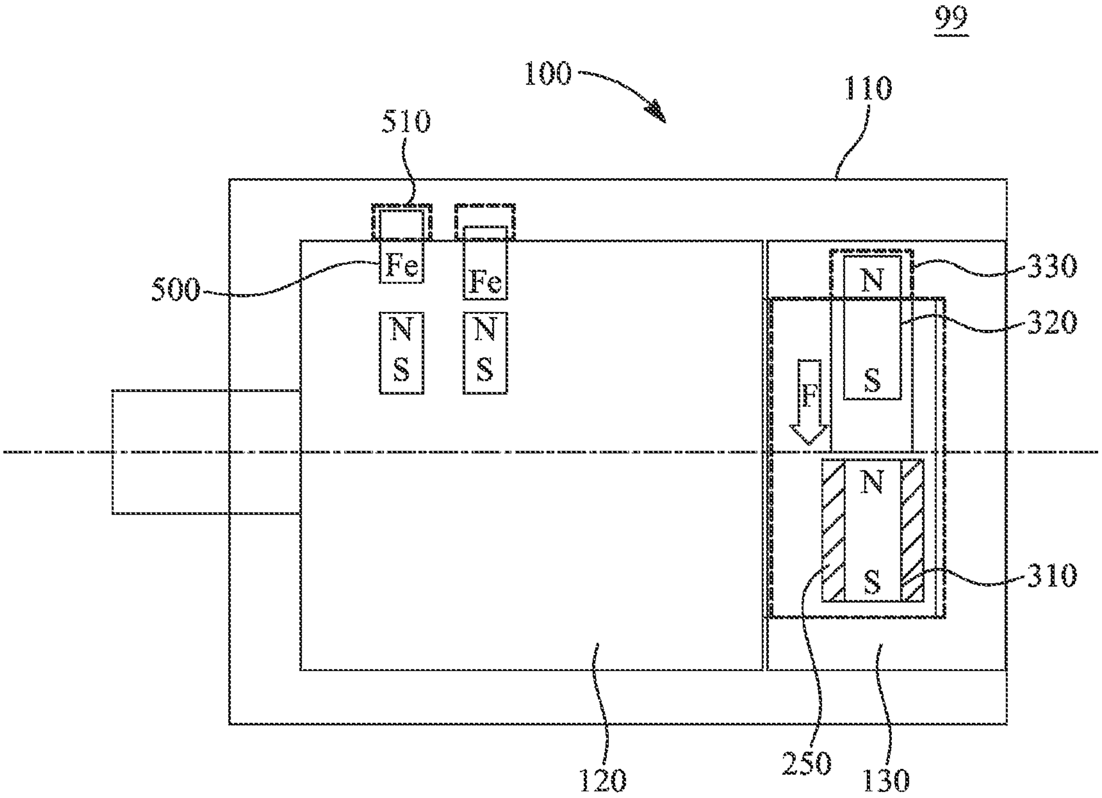
FIG. 18 demonstrates an embodiment 99 of the digital lock having the blocking pins, in accordance with the invention as a block diagram.

FIG. 18 demonstrates an embodiment 99 of the digital lock 100 having the blocking pins 500, in accordance with the invention as a block diagram. The magnetic materials are divided into two main groups, namely soft and hard magnetic materials. The method of differentiating between the soft magnetic material and the hard magnetic material is based on the value of coercivity. In an example, magnetic induction of materials may be reduced to zero by applying reverse magnetic field of strength and such a field of strength is defined as coercivity. Further, coercivity is the structure-sensitive magnetic property that can be altered by subjecting the magnetic material to different thermal and mechanical treatment. The hard and soft magnetic materials may be used to distinguish between ferromagnets on the basis of coercivity. Standard IEC Standard 404-1 proposed 1 kA/m as a borderline value of coercivity for the soft and hard magnetic materials. In one example, soft magnetic materials with coercivity lower than 1 kA/m is considered. In another example, hard magnetic materials with coercivity higher than 1 kA/m is considered. Further, between soft and hard magnetic materials there is a group of magnetic materials called semi-hard magnetic materials and coercivity of the semi-hard magnetic materials is 1 to 100 kA/m. Typically semi-hard magnet 310 will feature these values, and hard magnet 320 will have coercivity higher than 100 kA/m.

All magnetic materials are characterized by different forms of hysteresis loop. The most important values are: remanence Br, coercivities Hc and maximum energy product (BH) max that determines the point of maximum magnet utilization. Maximum energy product is a measure of the maximum amount of useful work that a permanent magnet is capable of doing outside the magnet. Typically magnets small in size and mass, and high in maximum energy product are preferable in this invention.

As described earlier, the digital lock 100 includes at least one blocking pin 500 configured to protrude into the notch 510 of the lock body 110 due to any of the following: when an external magnetic field is applied, when external hit or impulse is applied, and/or when the first axle 120 is turned too fast, to prevent unauthorized opening of the digital lock 100. The digital lock 100 includes the semi hard magnet 310 and the hard magnet 320 configured to open or close the digital lock 100. The semi hard magnet 310 is placed adjacent to the hard magnet 320 and located inside the magnetisation coil 250.

Further, changing the magnetic polarization of the semi-hard magnet 310 having a coercivity of 58 kA/m requires roughly ten times lower energy as compared to the hard magnet 320 having a coercivity of 695 kA/m. Please refer to FIG. 7 for coercivities of various materials. Magnetization of the semi-hard magnet 310 lacks sufficient strength to change the hard magnet 320 remanence magnetization. Sources responsible for influencing magnetization of the semi-hard magnet 310 may be a primary field generated by the magnetization coil 250. In an example, when the digital lock 100 is set to be in the openable state 400, magnetization power peak is shorter than 1 ms. Successful magnetization of the semi-hard magnet 310 requires that the hard magnet 320 can move freely into the notch 330 during the openable state 400. Otherwise the magnetic field of the hard magnet 320 may have effect to the magnetic field of the semi-hard magnet 310 and the digital lock 100 may not be opened. Free movement of the hard magnet 320 is ensured by the position sensor 240 or mechanical arrangement. Further, when the digital lock 100 is in the openable state 400 the hard magnet's 320 field which is opposite to the semi hard magnet's 310 field is trying to turn the semi-hard magnet's 310 field back to the locked state 300, but the gap between reduces the field and the semi hard magnet's 310 coercivity can resist it. More particularly, the hard magnet 320 is always trying to set the digital lock 100 back to the secure and locked state 300. In another example, when the digital lock 100 is in the locked state 300, or openable state 400, magnetization power peak is shorter than 1 ms. Successful magnetization of the semi-hard magnet 310 may happen at all times. The hard magnet 320 can or can't move back freely. The digital lock 100 and the semi-hard magnet 310 and the hard magnet 320 are aligned, the digital lock 100 is in the rest state. Very high coercivity of the hard magnet 320 keeps the semi-hard magnet 310 and the hard magnet 320 together, thereby ensuring the digital lock to be in the locked state 300.

In some implementation, sources responsible for influencing magnetization of the semi-hard magnet 310 may be a secondary field. The hard magnet 320 has high energy product providing constant magnetic field towards the semi-hard magnet 310, thereby trying to keep or turn the semi-hard magnet 310 to the locked state 300.

Any features of embodiment 99 may be readily combined or permuted with any of the other embodiments 10, 20, 30, 40, 50, 51, 60, 70, 80, 90, 91, 92, 93, 94, 95, 96, 97, 98, 101, 102, 103, 104, 105, 106, 107, 108, 109, 116, 111, 112, 113, 114, and/or 115 in accordance with the invention.

Figure 19:
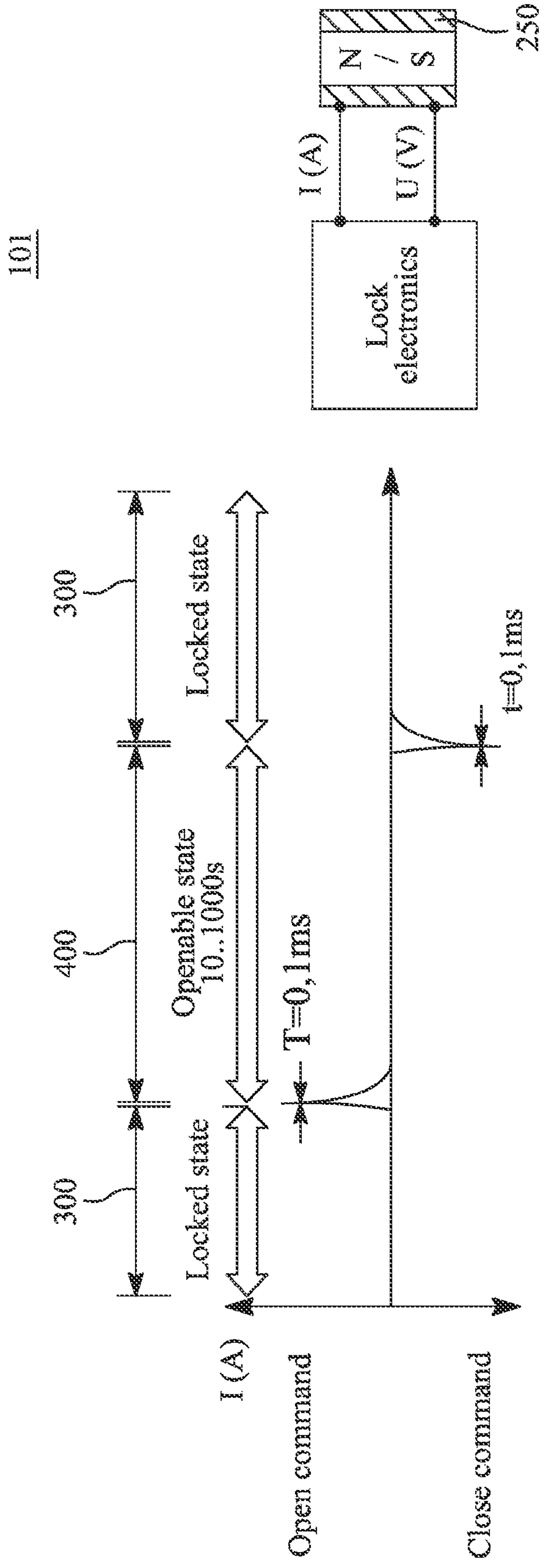
FIG. 19 demonstrates an embodiment 101 of the digital lock showing magnetization and power consumption in the locked state and in the openable state, in accordance with the invention as a block diagram.

FIG. 19 demonstrates an embodiment 101 of the digital lock 100 showing magnetization and power consumption in the locked state 300 and in the openable state 400, in accordance with the invention as a block diagram. Since the digital lock 100 of the present disclosure overcomes requirement of cabled power supply, energy and power consumptions in autonomous microsystems employing the digital lock 100 are very limited. The energy consumption of the digital lock 100 is strongly the function of the volume of the semi-hard magnet 310. In particular, smaller the size of the semi-hard magnet 310, smaller will be the power consumption by the digital lock 100. The magnetization field strength is a function of the magnetization coil 250 characteristics, such as number of turns, wire diameter and resistance and its electric current (I). Relative high electric current is provided by the sufficient voltage (U). The main factor for low power consumption by the digital lock 100 is very short power consumption time (t). Energy consumed by the digital lock 100 is equal to function of the sufficient voltage (U), electric current (I), and power consumption time (t). Memory of the mechanical status of the digital lock 100 lays on the remanence of the semi-hard magnet 310 and the hard magnet 320 and coercivity properties of the semi-hard magnet 310 and the hard magnet 320, thereby ensuring zero power consumption by the digital lock 100. In an example, when the digital lock 100 is in the locked state 300, power consumption by the digital lock 100 is zero. Upon setting the digital lock 100 to the openable state 400, less than 0.1 ms long magnetization pulse is provided. In another example, when the digital lock 100 is in the openable state 400, power consumption by the digital lock 100 is zero. Upon setting the digital lock 100 to the locked state 300, less than 0.1 ms long magnetization is provided. Total energy consumption of the locking mechanism of the digital lock 100 may be in magnitude 10 mVAs per opening cycle of the digital lock 100. The duration of the openable state 400 in FIG. 19 is exemplary and non-limiting. The duration in either locked or openable state depends on the use of the digital lock 100.

Any features of embodiment 101 may be readily combined or permuted with any of the other embodiments 10, 20, 30, 40, 50, 51, 60, 70, 80, 91, 92, 93, 94, 95, 96, 97, 98, 99, 102, 103, 104, 105, 106, 107, 108, 109, 116, 111, 112, 113, 114, and/or 115 in accordance with the invention.

Figure 20:
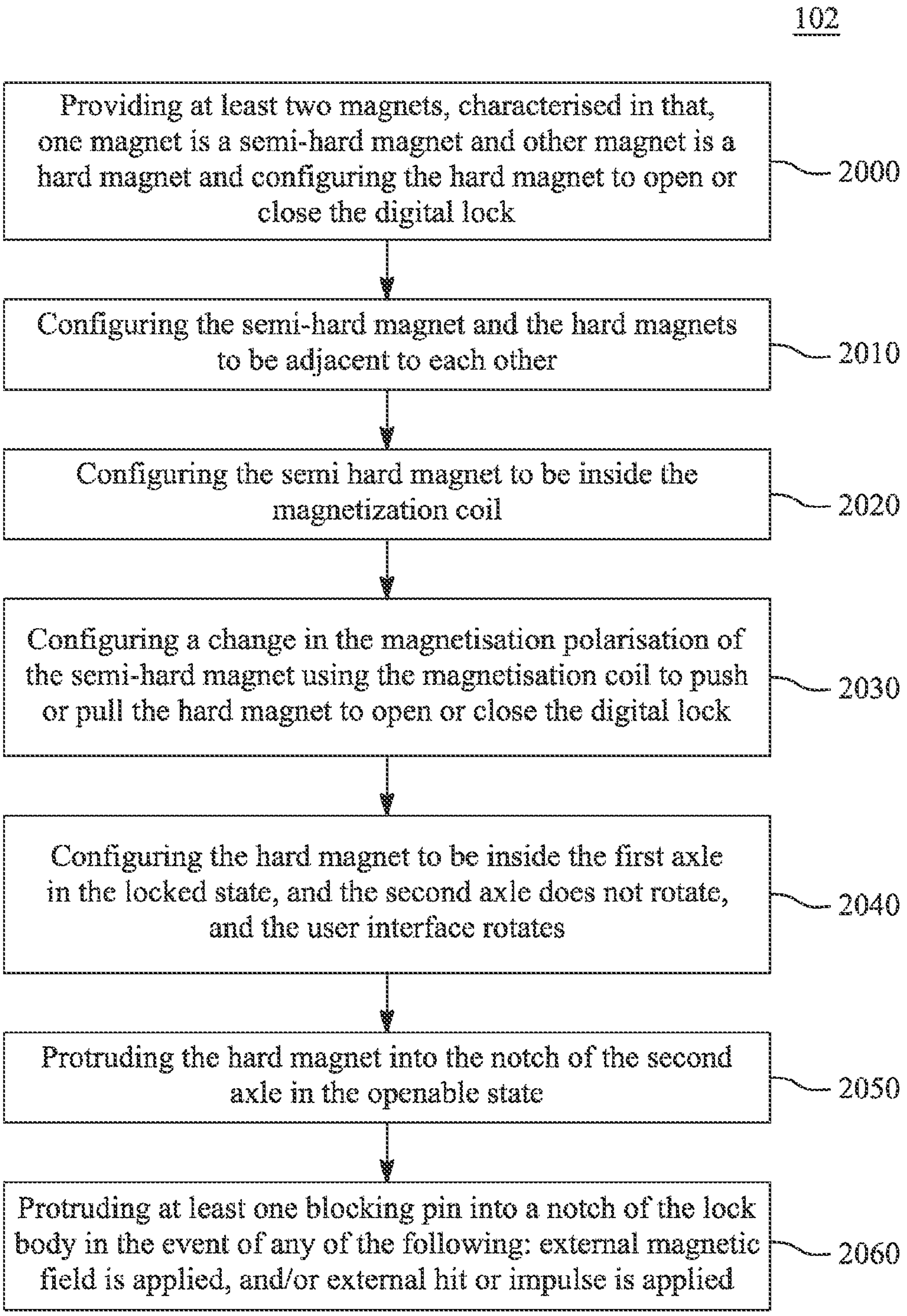
FIG. 20 demonstrates an embodiment 102 of a method for operating the digital lock, in accordance with the invention as a flow diagram.

FIG. 20 demonstrates an embodiment 102 of a method for operating the digital lock 100, in accordance with the invention as a flow diagram. The method could be implemented in a system identical or similar to embodiments 10, 20, 30, 40, 50, 60, 70, and 80 in FIGS. 1, 2, 3, 4, 5, 6, 7, and 8 for example, as discussed in the other parts of the description.

In phase 2000, at least two magnets are provided in the digital lock 100. One magnet is the semi hard magnet 310 and the other magnet is the hard magnet 320. The hard magnet 320 is configured to open or close the digital lock 100. In an example, hard magnet's 320 with coercivity higher than 500 kA/m is considered. In another example, semi-hard magnet's 310 with coercivity 50 to 100 kA/m is considered. The digital lock operates well when the coercivity of the hard magnet is 10 times higher than that of the semi-hard magnet. However, in some embodiments it is sufficient for the coercivity of the hard magnet 320 to be 5 times higher than the coercivity of the semi-hard magnet 310. The semi hard magnet 310 is made up of Alnico and the hard magnet 320 is made up of SmCo. In particular, the semi hard magnet 310 is made up of iron alloys which in addition to Iron (Fe) is composed of Aluminium (Al), Nickel (Ni), and Cobalt (Co). In an example, the semi hard magnet 310 may also be made up of copper and titanium.

The hard magnet 320 is a permanent magnet made of an alloy of Samarium (Sm) and Cobalt (Co). In an example, the hard magnet 320 may be an object made from a material that can be magnetised and which can create own persistent magnetic field unlike the semi hard magnet 310 which needs to be magnetised.

In phase 2010, the semi hard magnet 310 and the hard magnet 320 are configured to be placed adjacent to each other.

In phase 2020, the semi hard magnet 310 is configured to be inside the magnetisation coil 250. Sources responsible for influencing magnetization of the semi-hard magnet 310 may be a primary field generated by the magnetization coil 250. In an example, when the digital lock 100 is set to be in the openable state 400, magnetization power peak is shorter than 1 ms. Successful magnetization of the semi-hard magnet 310 requires that the hard magnet 320 can move freely into the notch 330 during the openable state 400. Otherwise the magnetic field of the hard magnet 320 may have effect to the magnetic field of the semi-hard magnet 310 and the digital lock 100 may not be opened. Free movement of the hard magnet 320 is ensured by the position sensor 240 or mechanical arrangement. Further, when the digital lock 100 is in the openable state 400 the hard magnet's 320 field which is opposite to the semi hard magnet's 310 field is trying to turn the semi-hard magnet's 310 field back to the locked state 300, but the gap between reduces the field and the semi hard magnet's 310 coercivity can resist it. More particularly, the hard magnet 320 is always trying to set the digital lock 100 back to the secure and locked state 300.

In another example, when the digital lock 100 is in the locked or openable state 300, magnetization power peak is shorter than 1 ms. Successful magnetization of the semi-hard magnet 310 may happen at all times. The hard magnet 320 can or can't move back freely. The digital lock 100 and the semi-hard magnet 310 and the hard magnet 320 are aligned, the digital lock 100 is in the rest state. Very high coercivity of the hard magnet 320 keeps the semi-hard magnet 310 and the hard magnet 320 together, thereby ensuring the digital lock to be in the locked state 300. In some implementation, sources responsible for influencing magnetization of the semi-hard magnet 310 may be a secondary field. The hard magnet 320 has high energy product providing constant magnetic field towards the semi-hard magnet 310, thereby trying to keep or turn the semi-hard magnet 310 to the locked state 300.

In phase 2030, the change in the polarity of the semi-hard magnet 310 is configured to push or pull the hard magnet 320 to open or close the digital lock 100.

In phase 2040, the hard magnet 320 is configured to be inside the first axle in the locked state 300. In such a condition, the first axle 120 and the second axle 130 are not connected to each other. Thus, the second axle 130 does not rotate due to the movement of the first axle 120. Further, owing to the connection between the first axle 120 and the user interface 140, when the first axle 120 is rotated, the user interface 140 also rotates in a direction similar to that of the first axle 120. When the rest state of the digital lock 100 is to be in the locked state 300, the digital lock 100 is configured to return to the locked state 300.

In phase 2050, the hard magnet 320 is protruded into the notch 330 of the second axle 130 in the openable state 400. The position sensor 240 is configured to position the notch 330 of the second axle 130 in place for the hard magnet 320 to enter the notch 330. When the rest state of the digital lock 100 is to be in the openable state 400, the digital lock 100 is configured to return to the openable state 400. Further, when the digital lock 100 is in the openable state 400 the hard magnet 320 is protruded into the notch 330 of the second axle 130. In such a condition, as the hard magnet 320 is protruded into the notch 330 of the second axle 130, the user may be able to open the digital lock 100, as the digital lock 100 is in the openable state 400. The notch 330 ensures easy opening of the digital lock 100 as the hard magnet 320 protrudes into the notch 330. The notch 330 also prevents unauthorized opening of the digital lock 100, when the first axle 120 is turned too fast.

In phase 2060, the blocking pin 500 is protruded into the notch 330 of the lock body 110 due to any of the following: when an external magnetic field is applied, and/or when external hit or impulse is applied.

Any features of embodiment 102 may be readily combined or permuted with any of the other embodiments 10, 20, 30, 40, 50, 51, 60, 70, 80, 91, 92, 93, 94, 95, 96, 97, 98, 99, 101, 103, 104, 105, 106, 107, 108, 109, 116, 111, 112, 113, 114, and/or 115 in accordance with the invention.

Figure 21:
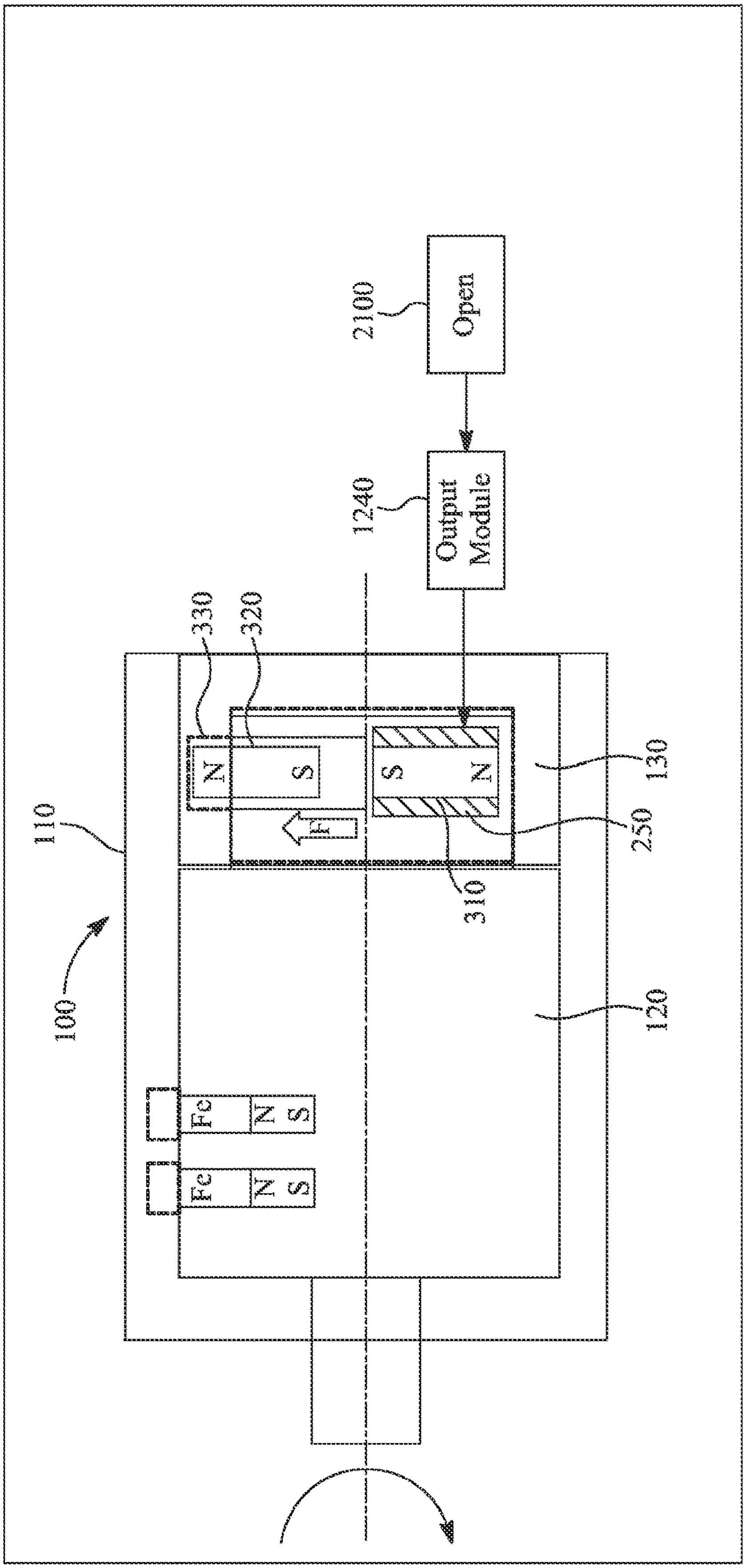
FIG. 21 demonstrates an embodiment 103 of the software program product, in accordance with the invention as a screen shot diagram.

FIG. 21 demonstrates an embodiment 103 of the software program product 1100, in accordance with the invention as a screen shot diagram. In the illustrated embodiment 103, a screen shot of the user operating the digital lock 100 is displayed. The hard magnet 320 is configured to open or close the digital lock 100. In an example, hard magnet's 320 with coercivity higher than 500 kA/m is used. The hard magnet 320 is a permanent magnet made of an alloy of Samarium (Sm) and Cobalt (Co). In an example, the hard magnet 320 may be an object made from a material that can be magnetised and which can create own persistent magnetic field unlike the semi hard magnet 310 which needs to be magnetised. The parameters responsible for opening the digital lock 100 is stored and saved in the cloud server 1710. Upon the user pressing on an icon 2100 that operates the digital lock 100, the computer instructs the hard magnet 320 of the digital lock 100 to enter the notch 330. Thus, creating traction, and opening the digital lock 100. In such a case, the digital lock 100 is in the openable state 400.

Any features of embodiment 103 may be readily combined or permuted with any of the other embodiments 10, 20, 30, 40, 50, 51, 60, 70, 80, 90, 91, 92, 93, 94, 95, 96, 97, 98, 99, 101, 102, 104, 105, 106, 107, 108, 109, 116, 111, 112, 113, 114, and/or 115 in accordance with the invention.

In some embodiments of the invention, the hard magnet 320 and/or the semi-hard magnet 310 may be realised from SENSORVAC (FeNiAlTi).

The default position of the digital lock can be either one, openable state or the locked state in accordance with the invention. This can be tuned by altering the distance between the hard magnet 320 and the semi-hard magnet 310 within the lock. The lock could be in the openable state forever, or could be configured to automatically return to the locked state without consuming electricity, which would create energy and power savings.

Figures 22A, 22B, 22C, 22D, 22E, 22F:
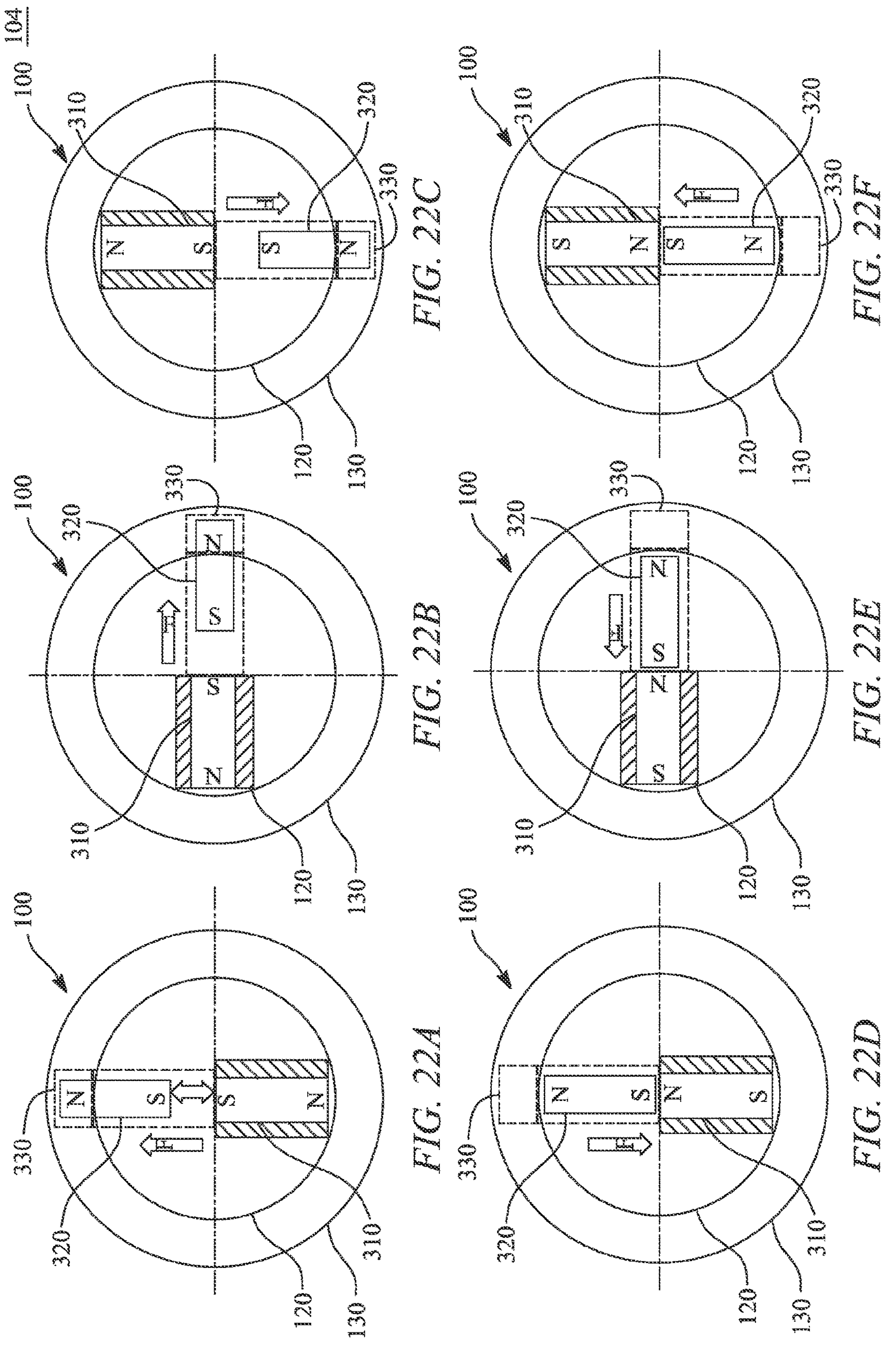
FIGS. 22A-F demonstrate an embodiment 104 of the invention depicting energy consumption of the digital lock in various implementation scenarios.

FIG. 22 demonstrates the different energy budgets needed by the inventive digital lock in different configurations in embodiment 104. The different lock configurations are shown in a series of FIGS. 22A-F, where gravity is in the up-down direction of each individual figure, i.e. in the up-down direction of the landscape page.

FIGS. 22A, 22B, 22C demonstrate the openable pulse energy, i.e. the energy budget used when the lock is brought from the locked state to the open state.

FIG. 22A shows the configuration at an angle 0 degrees to gravity. This configuration needs the highest energy, as the hard magnet 320 is lifted and kept up. The potential energy of the hard magnet in the lifted state increases the required energy pulse to open the digital lock.

FIG. 22B shows the configuration at an angle 90 degrees to gravity, which is equivalent also to the 270 degrees to gravity configuration. Friction between the hard magnet 320 and the notch 330 walls increases the energy consumption required to open the digital lock in this configuration.

FIG. 22C shows the configuration at an angle 180 degrees to gravity. This is the lowest energy case. The hard magnet's 320 potential energy reduces the openable pulse energy as the hard magnet 320 falls into the notch 330.

If the lock is configured with the locked state being the rest or default state the energy budget needs to exceed the requirement of FIG. 22A configuration for the digital lock to be openable in all configurations 22A-C. In a prototype 3*47 μF capacitors were required to produce the opening pulse.

FIGS. 22D, 22E, 22F demonstrate the locked pulse energy, i.e. the energy budget used when the lock is brought from the open state to the locked state.

FIG. 22D shows the configuration at an angle 0 degrees to gravity. This configuration needs the least energy, as the hard magnet 320 drops back out of the notch. The potential energy of the hard magnet 320 decreases the required energy pulse to lock the digital lock.

FIG. 22E shows the configuration at an angle 90 degrees to gravity, which is equivalent also to the 270 degrees to gravity configuration. Friction between the hard magnet 320 and the notch 330 walls increases the energy consumption required to open the digital lock in this configuration.

FIG. 22F shows the configuration at an angle 180 degrees to gravity. This is the highest energy case. The hard magnet's 320 potential energy increases the locking pulse energy as the hard magnet 320 is lifted out of the notch 330. This sets the requirement for the energy budget to cover all configurations. In a prototype 47 μF capacitor was used to lock to locked state in all positions.

Thus in some embodiments the closing energy pulse may be ⅓ of the opening energy pulse. In a preferred embodiment the motion distance between the semi hard magnet 310 and hard magnet 320 is optimised so that the hard magnet 320 almost changes the polarity of the semi hard magnet 310. Then only a small magnetisation pulse is required to the semi-hard magnet, and the reversal happens, for example to close the lock as shown in FIG. 22C.

In one embodiment the distance between the hard magnet 320 and the semi hard magnet 310 is set so long, that a magnetization pulse is required in both directions of movement. In an alternative embodiment, the hard magnet 320 relaxes out of the notch 330 to return to the locked state, which would be the rest state of the lock system in this case.

Also the surrounding material matters and should be optimised to a particular motion distance that the hard magnet 320 is designed to move.

The embodiment that requires the smallest amount of magnetic pulse energy is the one shown in 22A, where the hard magnet 320 simply drops back out of the notch 330.

It has been observed experimentally that the digital lock consumes 30% less magnetic pulse energy when the hard magnet 320 moves to close the digital lock, than when the hard magnet moves to open the digital lock and pushes into the notch 330.

Any features of embodiment 104 may be readily combined or permuted with any of the other embodiments 10, 20, 30, 40, 50, 51, 60, 70, 80, 90, 91, 92, 93, 94, 95, 96, 97, 98, 99, 101, 102, 103, 105, 106, 107, 108, 109, 116, 111, 112, 113, 114, and/or 115 in accordance with the invention.

Figure 23A:
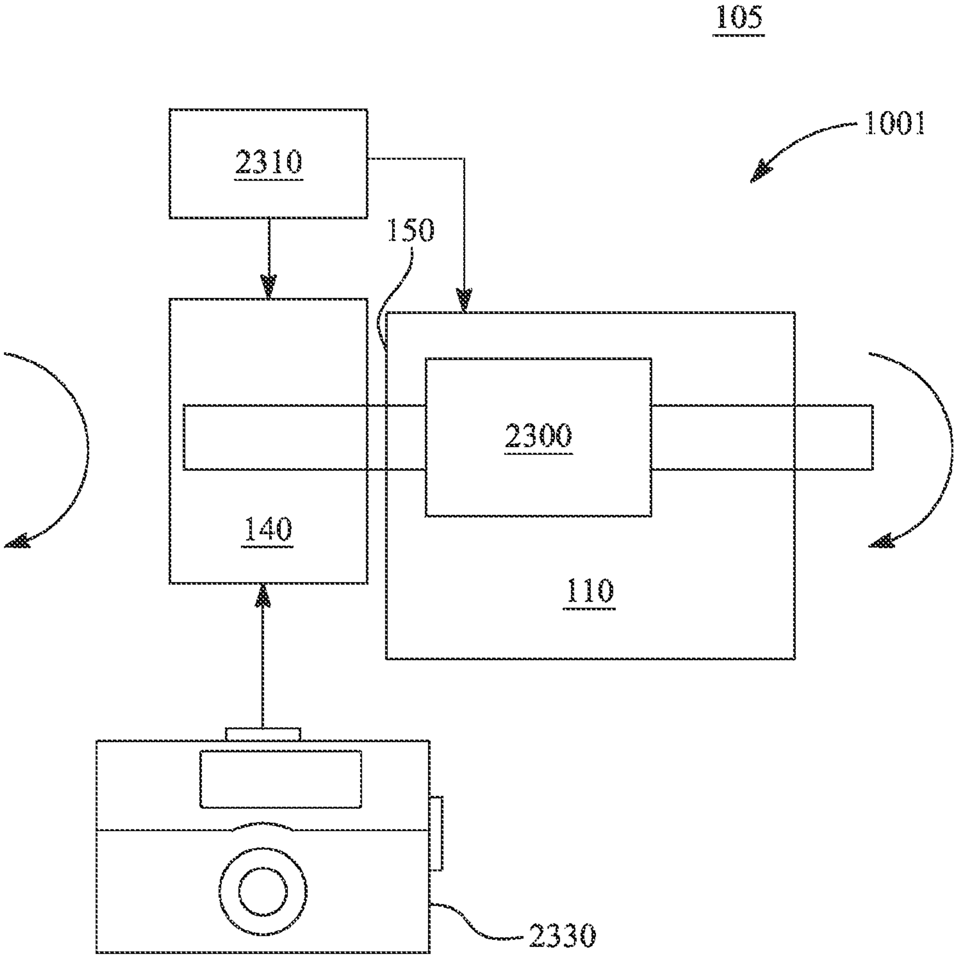
FIG. 23A demonstrates an embodiment 105 of the single axis rotational digital lock, in accordance with the invention as a block diagram.

FIG. 23A demonstrates a single axis rotational embodiment 105 of the digital lock 1001, in accordance with the invention as a block diagram. The digital lock 1001 includes the lock body 110, only one axle 2300 configured to be rotatable, and the user interface 140. The axle 2300 is located within the lock body 110. In an example, the axle 2300 may be a shaft configured to be rotatable. In addition, the user interface 140 is connected to the axle 2300 of the digital lock 101. In one implementation, the user interface 140 is attached to the outer surface 150 of the lock body 110. In an example, the user interface 140 may be a door handle, a door knob, or a digital key reading device. In the illustrated embodiment, locking or unlocking of the digital lock 1001 is due to rotational movement of the user interface 140. In an example, if a user intends to lock or unlock the digital lock 1001, the user interface 140, for example, a knob, may be operated with a rotational movement by the user. More particularly, the user interface 140 may be rotated sideways, by the user, to lock or unlock the digital lock 1001.

The single axis rotational digital lock 1001 may be powered by a photovoltaic solar cell 2310 to lock and unlock the door without the requirement of electrical components such as motors. The photovoltaic solar cell 2310 may be an electrical device that converts the energy of sunlight into electricity by the photovoltaic effect to power the digital lock 1001. The photovoltaic solar cell 2310 may also be a semiconductor device made from wafers of highly purified silicon (Si) doped with special impurities giving abundance of either electrons or holes within their lattice structure. In an example, the photovoltaic solar cell 2310 may be located on the outer surface 150 of the lock body 110 to receive the sunlight and power the digital lock 1001. In another example, the photovoltaic solar cell 2310 may be located on an inner surface of the lock body 110 to power the digital lock 1001. In yet another example, the photovoltaic solar cell 2310 may be located at any portion on the lock body 110 suitably to receive light and power the lock body 110. Further, the photovoltaic solar cell 2310 may be located on an outer surface of the user interface 140. In such an implementation of the photovoltaic solar cell 2310 on the user interface 140, the photovoltaic solar cell 2310 may be used to receive the sunlight and power the single axis rotational digital lock 1001 to lock or unlock the door.

In an example, a 3D camera 2330 may be located on the user interface 140 to capture the image of the user. In another example, the 3D camera 2330 may be located at any appropriate location on the door to capture the image of the user. In the aforementioned example, the 3D camera 2330 may be connected to the user interface 140. The 3D camera 2330 may be an imaging device that enables the perception of depth in images to replicate three dimensions as experienced through human binocular vision. In an example, the 3D camera 2330 may use two or more lenses to record multiple points of view. In another example, the 3D camera 2330 may use a single lens that shifts its position.

The 3D camera 2330 may be used to capture an image of the user and communicate the captured image to the identification device 210. Since the identification device 210 is a part of the user interface 140 and the 3D camera 2330 is located on the user interface, the identification device 210 is capable of identifying and allowing access to the user to lock or unlock the digital lock 1001. Access to the user to lock or unlock the door is allowed upon authenticating the user by comparing the captured image with an image of the user stored in the database of the electronic lock module 200. In an example, the image captured may be any of the following: user's face, palm, forearm, eyes, or any other feature of the user. In an example, the 3D camera 2330 may be any of the following: Fujifilm FinePix Real 3D W3, Sony Alpha SLT-A55, Panasonic Lumix DMC-TZ20, Olympus TG-810, and/or Panasonic Lumix DMC-FX77.

Any features of embodiment 105 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 106, 107, 108, 109, 116, 111, 112, 113, 114, and/or 115 in accordance with the invention.

Figure 23B:
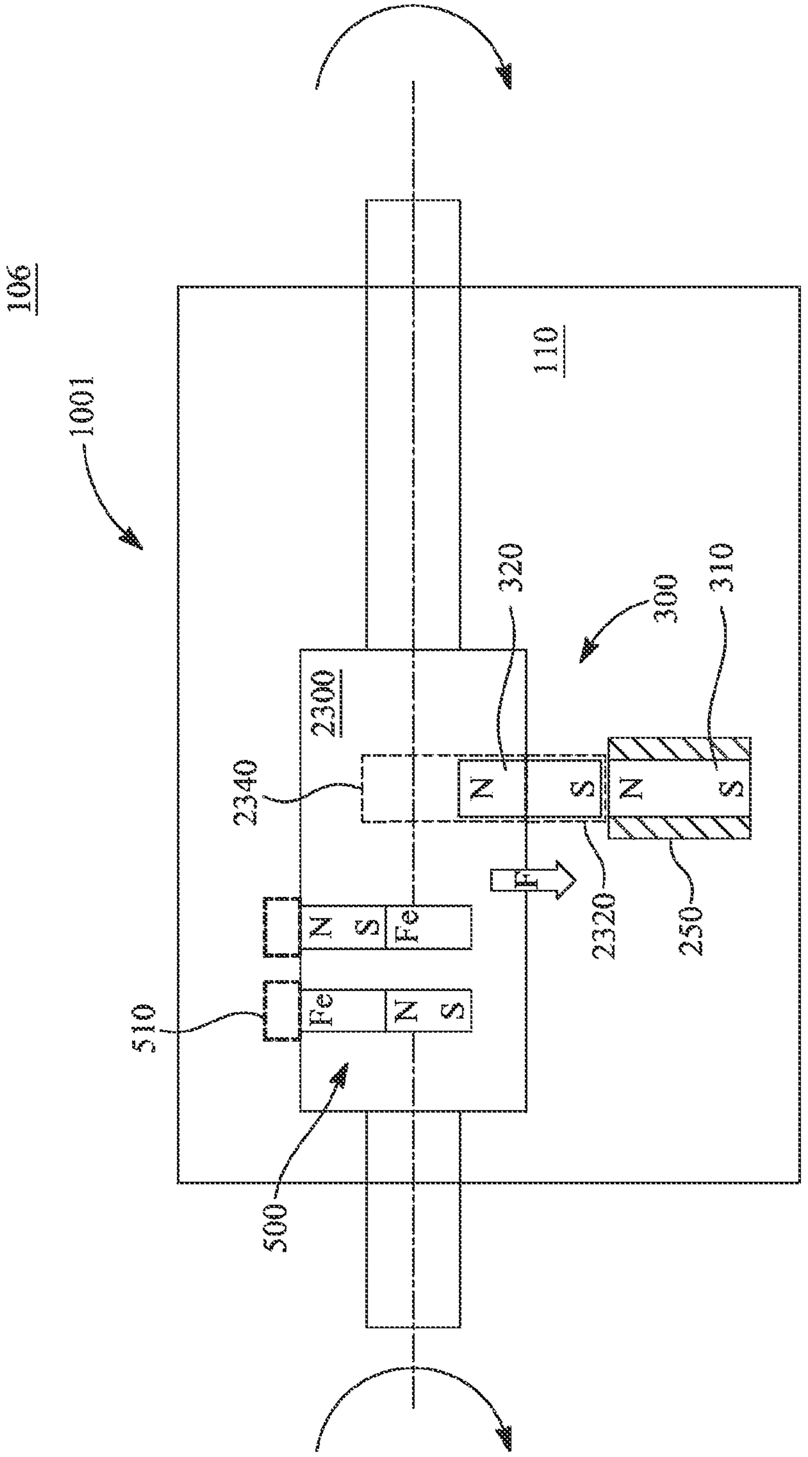
FIG. 23B demonstrates an embodiment 106 of the single axis rotational digital lock in the locked state, in accordance with the invention as a block diagram.

FIG. 23B demonstrates an embodiment 106 of the single axis rotational digital lock 1001 in the locked state 300, in accordance with the invention as a block diagram. As described earlier, the digital lock 1001 includes the semi hard magnet 310 and the hard magnet 320 configured to open or close the digital lock 1001. The semi hard magnet 310 is provided within the lock body 110 and is inside the magnetisation coil 250 and the hard magnet 320 is a permanent magnet. The hard magnet 320 may be an object made from a material that can be magnetised and which can create its own persistent magnetic field unlike the semi hard magnet 310 which needs to be magnetised.

The semi hard magnet 310 is configured to push or pull the hard magnet 320 to open or close the digital lock 1001, in response to change in polarisation of the semi hard magnet 310 by the magnetization coil 250. In particular, when the digital lock 1001 is in the locked state 300, the semi hard magnet 310 is configured to have a polarity such that, the north pole of the semi hard magnet 310 faces the south pole of the hard magnet 320. By virtue of magnetic principle, the semi hard magnet 310 and the hard magnet 320 are attracted to each other. As a result of such arrangement, the hard magnet 320 is partially received in the notch 2340 of the axle 2300 and a notch 2320 of the lock body 110. In some implementations, it may be understood that the polarity of the semi hard magnet 310 and the hard magnet 320 may be such that, the south pole of the semi hard magnet 310 faces the north pole of the hard magnet 320, causing the semi hard magnet 310 and the hard magnet 320 to be attracted to each other.

The dual axis digital lock 100 is configured to operate between the locked state 300 and the openable state 400 (as shown in FIGS. 3 and 4). When the single axis digital lock 1001 is in the locked state 300, the hard magnet 320 is configured to be partially inside the axle 2300 and partially inside the lock body 110, inside the notches 2320, 2340. In such a condition, the hard magnet 320 blocks the rotation of the axle 2300. Further, when the user attempts to unlock the digital lock 1001 by rotating the user interface 140, in the locked state 300, force may be exerted on the hard magnet 320 via the axle 2300. The exerted force is then transferred to the hard magnet 320 owing to the connection between the axle 2300 and the hard magnet 320. Since the hard magnet 320 is made of an alloy of Samarium (Sm) and Cobalt (Co), the hard magnet 320 is strong and may withstand force exerted through the axle 2300. Sometimes a Titanium Pin is used as a covering shell for the hard magnet 320 to provide a mechanically strong outer surface for the hard magnet 320. A limiting mechanism may be provided in the axle 2300 to prevent any force exerted from the user interface 140 to be transferred onto the hard magnet 320. In an example, the limiting mechanism may be any mechanism/component provided to limit the force from being transferred to the hard magnet 320 through the axle 2300.

Any features of embodiment 106 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 107, 108, 109, 116, 111, 112, 113, 114, and/or 115 in accordance with the invention.

Figure 23C:
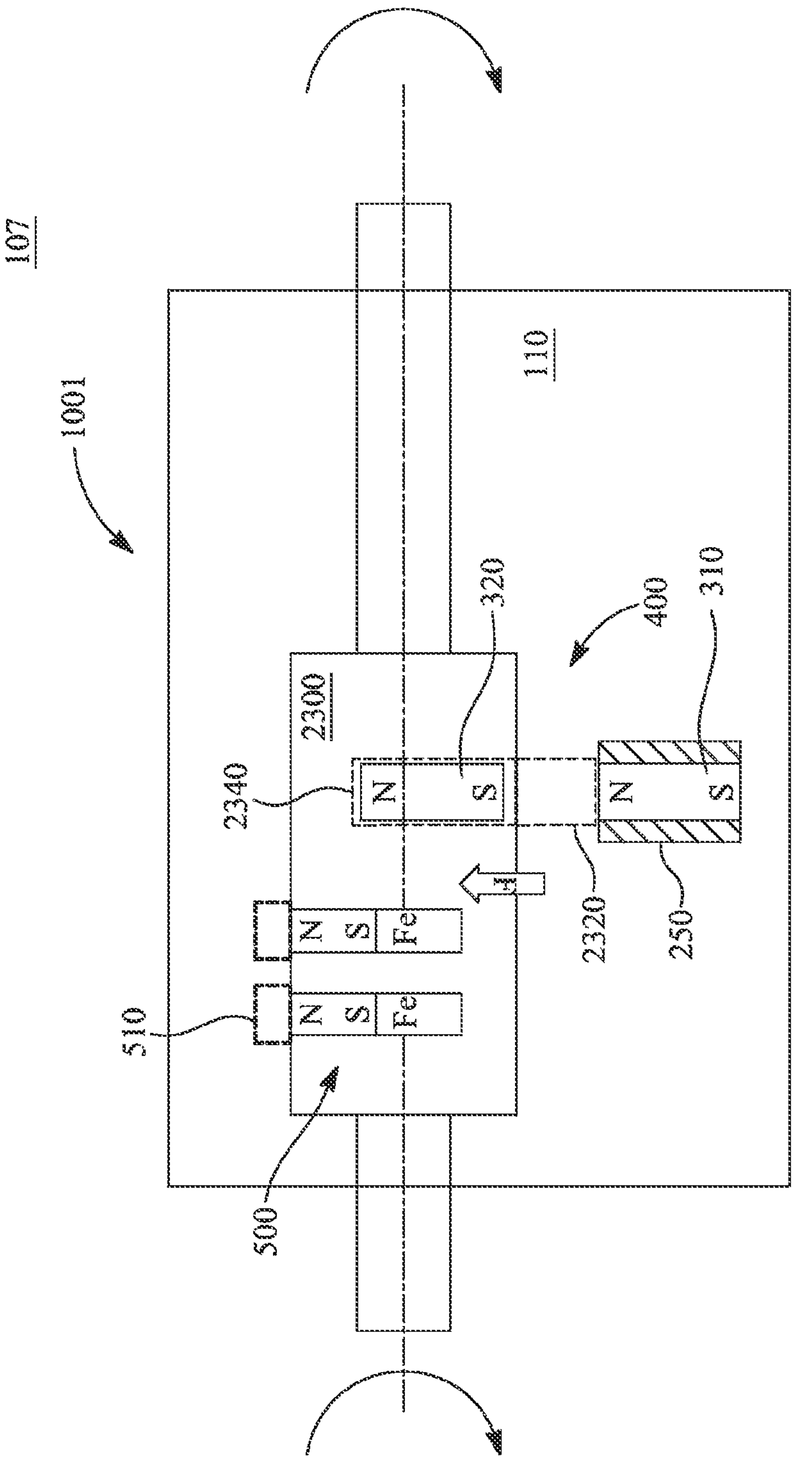
FIG. 23C demonstrates an embodiment 107 of the single axis rotational digital lock in the openable state, in accordance with the invention as a block diagram.

FIG. 23C demonstrates an embodiment 107 of the single axis rotational digital lock 1001 in the openable state 400, in accordance with the invention as a block diagram. When the digital lock 1001 is in the openable state 400, the semi hard magnet 310 is configured to have a polarity such that, the south pole of the semi hard magnet 310 faces the south pole of the hard magnet 320. By virtue of magnetic principle, the hard magnet 320 repels away from the semi hard magnet 310. As a result of such arrangement, the hard magnet 320 enters into the notch 2340 of the axle 2300. In such a condition, as the hard magnet 320 is protruded into the notch 2340 of the axle 2300, the user may be able to open the rotational single axis digital lock 1001. When the user rotates the user interface 140, the axle 2300 also rotates. Rotation of the axle 2300 is possible owing to the connection between axle 2300 and the user interface 140. In an example, a return spring may be used to bring the axle 2300 to its initial position when the user rotates the user interface 140. In one implementation, the return spring may be a torsional spring disposed in a gap defined between the axle 2300 and the lock body 110 of the digital lock 1001.

The single axis lock is typically simpler in contrast to locks with multiple axes.

Any features of embodiment 107 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 108, 109, 116, 111, 112, 113, 114, and/or 115 in accordance with the invention.

Figures 23D, 23E, 23F:
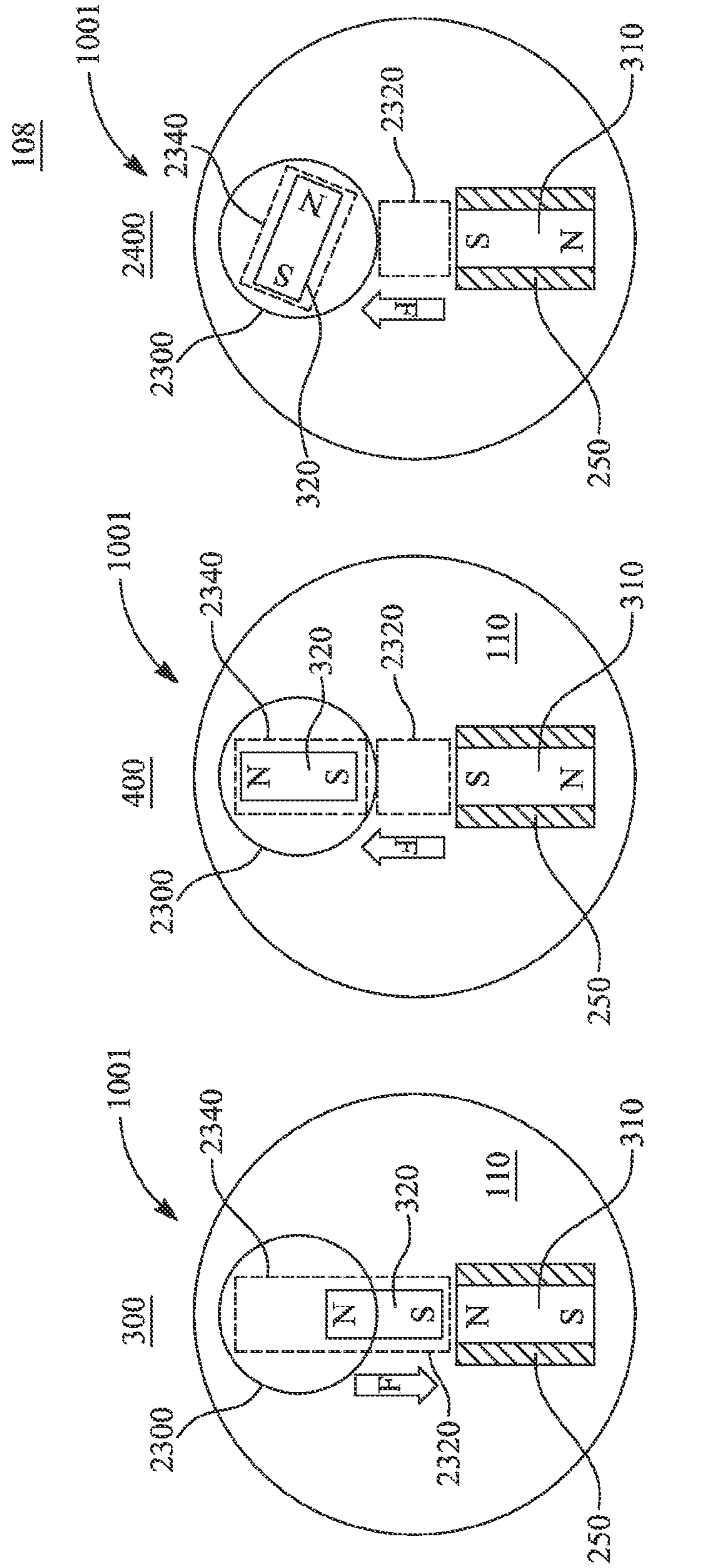
FIGS. 23D, 23E, and 23F demonstrate an embodiment 108 of the single axis rotational digital lock showing the locked state, the openable state, and an opened state in accordance with the invention as a block diagram.

FIGS. 23D, 23E, and 23F demonstrate an embodiment 108 of the single axis rotational digital lock 1001 showing the locked state 300, the openable state 400, and an opened state 2400 in accordance with the invention as a block diagram. When the digital lock 1001 is in the locked state 300, the semi hard magnet 310 is configured to have a polarity such that, the north pole of the semi hard magnet 310 faces the south pole of the hard magnet 320. By virtue of magnetic principle, the semi hard magnet 310 and the hard magnet 320 are attracted to each other. As a result of such arrangement, the hard magnet 320 is partially received in the notch 2340 of the axle 2300 and the notch 2320 of the lock body 110 as shown in FIG. 23D, preventing the rotation of the axle 2300. Referring to FIG. 23E, when the digital lock 1001 is in the openable state 400, the hard magnet 320 enters into the notch 2340 of the axle 2300. In such a condition, as the hard magnet 320 is protruded into the notch 2340 of the axle 2300, the user may open the digital lock 1001 by e.g. turning the user interface 140 and rotating the axle 2300. Referring to FIG. 23F, in the opened state 2400, when the user rotates the user interface 140 in clockwise direction, the hard magnet 320 is rotated for a predefined angular position. In an example, the predefined angular position of the hard magnet 320 is about 120 degrees.

Any features of embodiment 108 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 109, 116, 111, 112, 113, 114, and/or 115 in accordance with the invention.

Figure 24A:
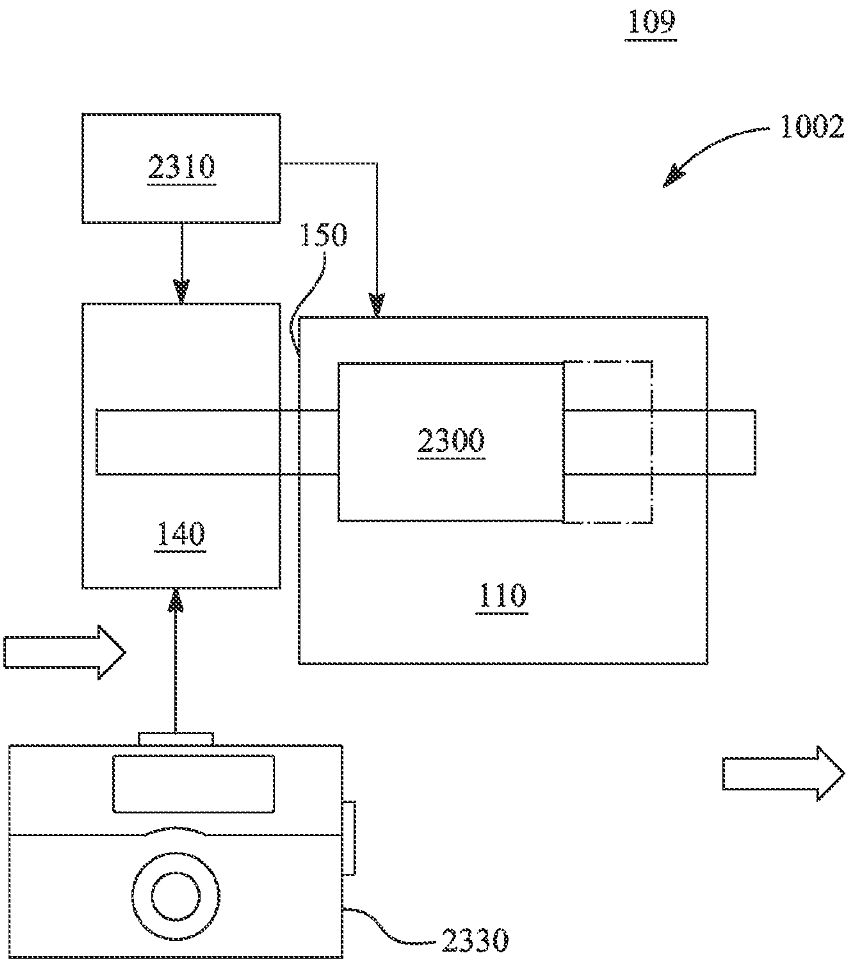
FIG. 24A demonstrates an embodiment 109 of the single linear axis digital lock, in accordance with the invention as a block diagram.

FIG. 24A demonstrates an embodiment 109 of the single axis translational digital lock 1002, in accordance with the invention as a block diagram. This digital lock 1002 includes the lock body 110, the axle 2300 configured to be moved linearly, and the user interface 140. In the illustrated embodiment, locking or unlocking of the digital lock 1002 is due to linear movement of the user interface 140. In an example, if a user intends to lock or unlock the digital lock 1002, the user interface 140, for example, a lever or a push button, may be operated with a linear movement by the user. More particularly, the user interface 140 may be moved backward and forward, by the user, to lock or unlock the digital lock 1002.

The digital lock 1002 may be powered by the photovoltaic solar cell 2310 to lock and unlock the door without the requirement of electrical components such as motors. In an example, the photovoltaic solar cell 2310 may be located on the outer surface 150, inner surface, and/or at any portion of the lock body 110 to receive light and power the digital lock 1002. Further, the photovoltaic solar cell 2310 may be located on the outer surface of the user interface 140. In such an implementation of the photovoltaic solar cell 2310 on the user interface 140, the photovoltaic solar cell 2310 may be used to receive light and power the lock body 110 to lock and/or unlock the door.

The 3D camera 2330 may be located on the user interface 140 to capture the image of the user. The 3D camera 2330 may be used to capture an image of the user and communicate the captured image to the identification device 210. Since the identification device 210 is a part of the user interface 140 and the 3D camera 2330 is located on the user interface, the identification device 210 is capable of identifying and allowing access to the user to lock or unlock the digital lock 1002. Access to the user to lock or unlock the door is allowed upon authenticating the user by comparing the captured image with an image of the user stored in the database of the electronic lock module 200.

Any features of embodiment 109 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 116, 111, 112, 113, 114, and/or 115 in accordance with the invention.

Figure 24B:
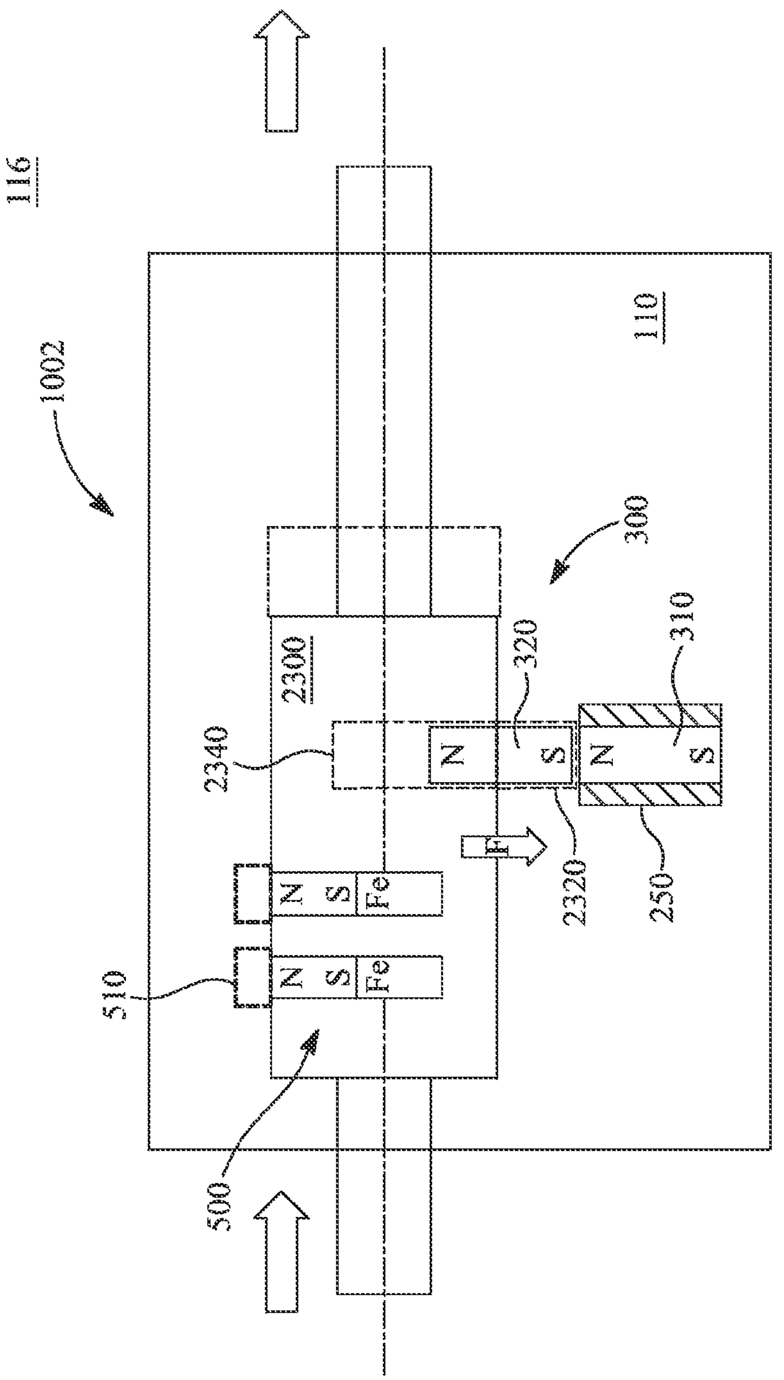
FIG. 24B demonstrates an embodiment 116 of the single linear axis digital lock in the locked state, in accordance with the invention as a block diagram.

FIG. 24B demonstrates an embodiment 116 of the digital lock 1002 in the locked state 300, in accordance with the invention as a block diagram. When the digital lock 1002 is in the locked state 300, the semi hard magnet 310 is configured to have a polarity such that, the north pole of the semi hard magnet 310 faces the south pole of the hard magnet 320. By virtue of magnetic principle, the semi hard magnet 310 and the hard magnet 320 are attracted to each other. Because of such arrangement, the hard magnet 320 is partially received in the notch 2340 of the axle 2300 and the notch 2320 of the lock body 110.

When the digital lock 1002 is in the locked state 300, the hard magnet 320 is configured to be partially inside the axle 2300 inside the notch 2340. In such a condition, the hard magnet 320 blocks the translation, i.e. push or pull of the axle 2300 inside the lock body 110, as part of the hard magnet is also inside the notch 2320. Further, when the user attempts to unlock the digital lock 1002 by moving the user interface 140 linearly, in the locked state 300, force may be exerted on the hard magnet 320 via the axle 2300. The exerted force is then transferred to the hard magnet 320 owing to the connection between the axle 2300 and the hard magnet 320. A limiting mechanism may be provided in the axle 2300 to prevent any force exerted from the user interface 140 to be transferred onto the hard magnet 320.

Any features of embodiment 116 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 109, 111, 112, 113, 114, and/or 115 in accordance with the invention.

Figure 24C:
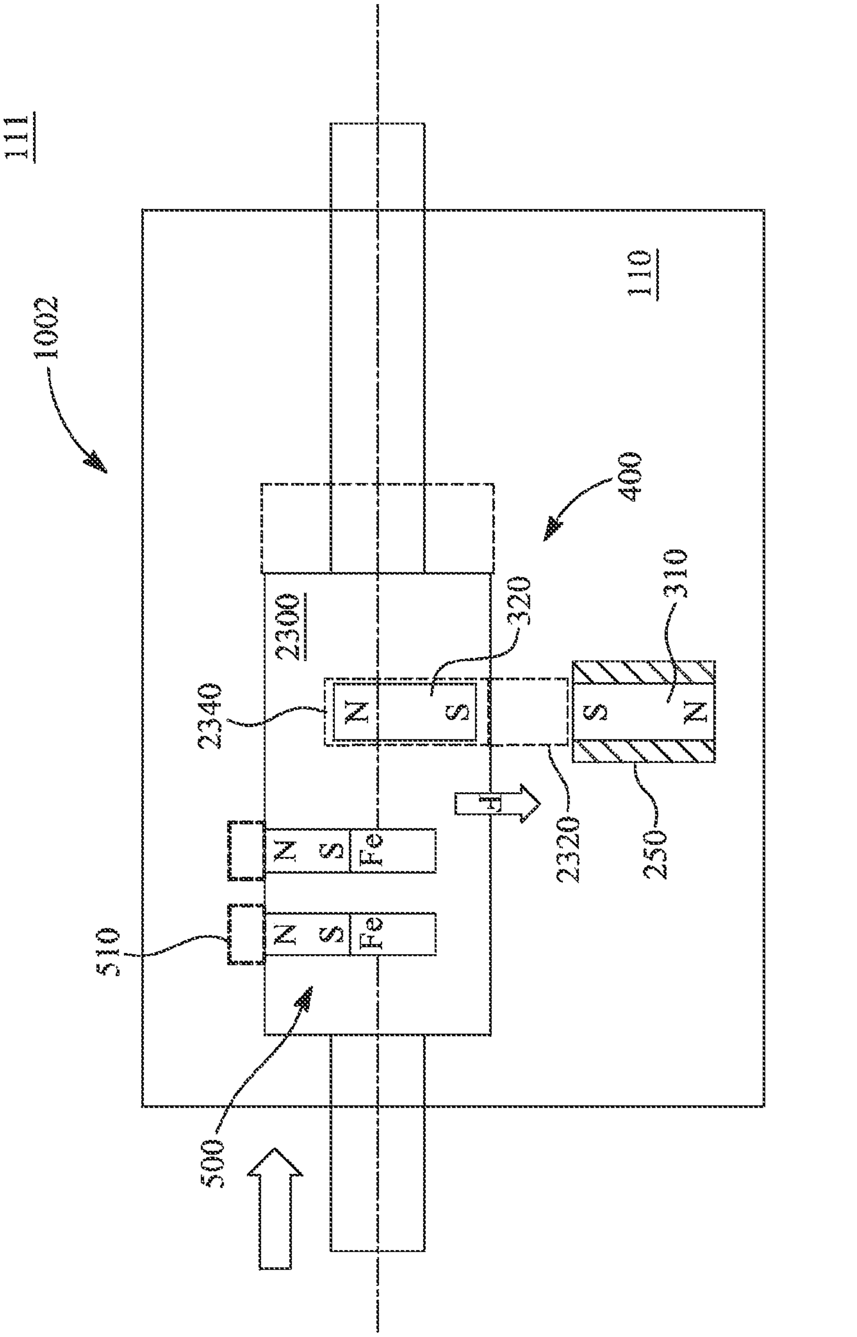
FIG. 24C demonstrates an embodiment 111 of the single linear axis digital lock in the openable state, in accordance with the invention as a block diagram.

FIG. 24C demonstrates an embodiment 111 of the digital lock 1002 in the openable state 400, in accordance with the invention as a block diagram. When the digital lock 1002 is in the openable state 400, the semi hard magnet 310 is configured to have a polarity such that, the south pole of the semi hard magnet 310 faces the south pole of the hard magnet 320. By virtue of magnetic principle, the hard magnet 320 repels away from the semi hard magnet 310. Because of such arrangement, the hard magnet 320 enters the notch 2340 of the axle 2300. In such a condition, as the hard magnet 320 is protruded into the notch 2340 of the axle 2300, the user may be able to open the digital lock 1002 by pushing the axle up the page.

Any features of embodiment 111 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 109, 116, 112, 113, 114, and/or 115 in accordance with the invention.

Figure 24D:
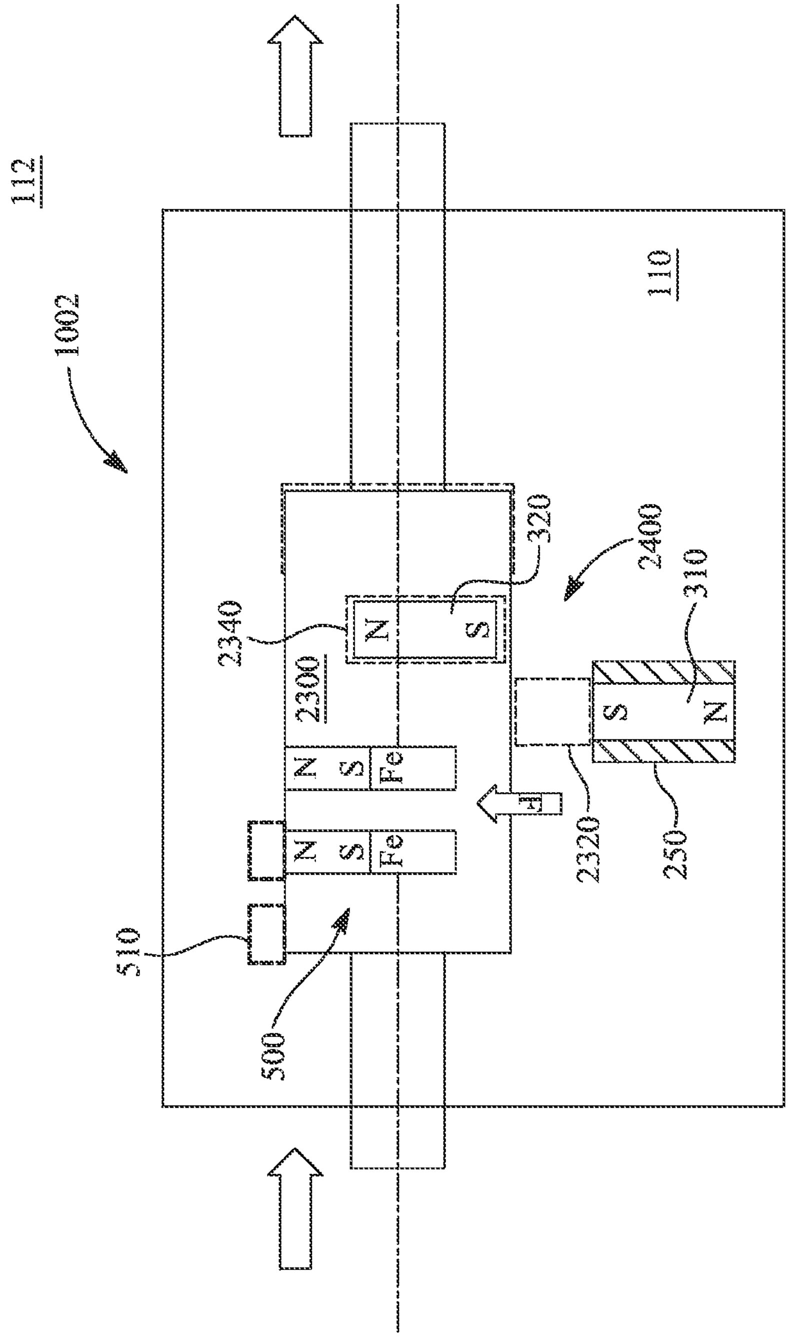
FIG. 24D demonstrates an embodiment 112 of the single linear axis digital lock in the opened state, in accordance with the invention as a block diagram.

FIG. 24D demonstrates an embodiment 112 of the single axis translational digital lock 1002 in the opened state 2400, in accordance with the invention as a block diagram. When the user moves the user interface 140 linearly, the axle 2300 also moves in a forward direction to unlock the door. Movement of the axle 2300 in the forward direction is possible owing to the connection between axle 2300 and the user interface 140. In an example, a return spring may be used to return the axle 2300 along with the hard magnet 320 to its initial position when the user moves the user interface 140 linearly. In another example, a compression spring may be used to return the axle 2300 along with the hard magnet 320 to its initial position when the user moves the user interface 140 linearly. The return spring may be disposed in a gap defined between the axle 2300 and the lock body 110 of the digital lock 1002.

All three locks 100, 1001 and 1002 may also be realised without the blocking pins 500 or their notches 510, to increase simplicity in some embodiments where the unauthorized entry is not a concern.

Any features of embodiment 112 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 109, 116, 111, 113, 114, and/or 115 in accordance with the invention.

Figure 25A:
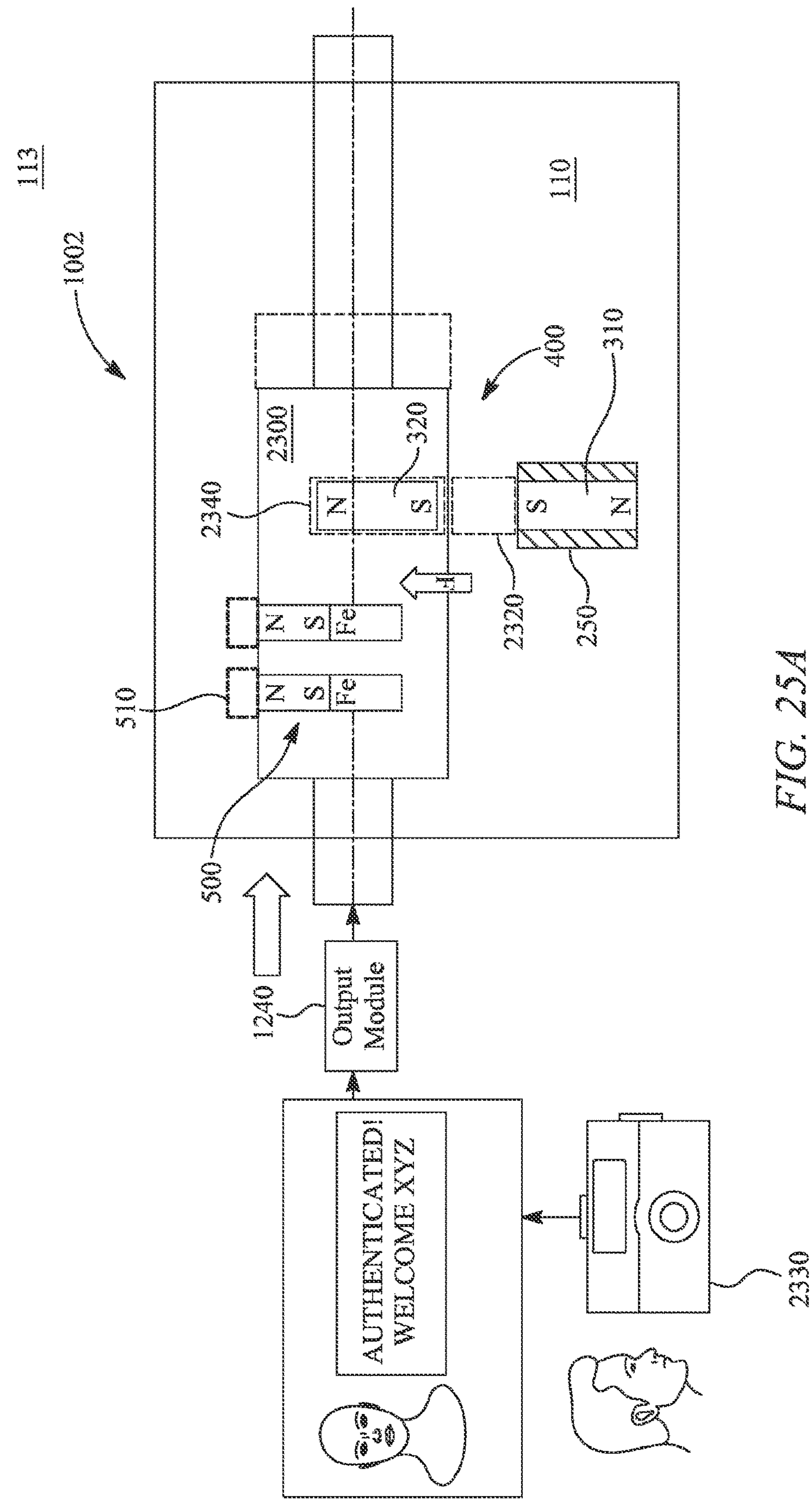
FIG. 25A demonstrates an embodiment 113 of the single axis digital lock and its operating software and user interface in the openable state, in accordance with the invention as a block diagram.

FIG. 25A demonstrates an embodiment 113 of the single axis translational digital lock 1002 in the openable state, and associated authentication software and hardware in accordance with the invention as a block diagram. The 3D camera 2330 may be used to capture an image of the user and communicate the captured image to the identification device 210. Since the identification device 210 is a part of the user interface 140 and the 3D camera 2330 is located on the user interface, the identification device 210 is capable of identifying the user to lock or unlock the digital lock 1002. The user is authenticated to unlock the digital lock 1002 when the image of the user captured by the 3D camera 2330 matches with the image of the user stored in the database. When the user is authenticated, the semi hard magnet 310 is configured to have a polarity such that, the south pole of the semi hard magnet 310 faces the south pole of the hard magnet 320. By virtue of magnetic principle, the hard magnet 320 repels away from the semi hard magnet 310. Because of such arrangement, the hard magnet 320 enters the notch 2340 of the axle 2300. In such a condition, as the hard magnet 320 is protruded into the notch 2340 of the axle 2300, the user may be able to open the digital lock 1002.

The authenticated information is communicated to the output module 1240 which sends a signal to the digital lock 1002 to move to or remain in the openable state 400 as shown. In addition, an authentication confirmation notification to the user is provided. The notification may be any of the following: an audio notification, a video notification, a multimedia notification, and/or a text notification. In an example, the captured image of the user may be any of the following: user's face, palm, forearm, eyes, or any other feature of the user. In another example, the user may be authenticated by any of the following: electronic key, tag, key tag, fingerprint, magnetic stripe, NFC device.

Any features of embodiment 113 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 109, 116, 111, 112, 114, and/or 115 in accordance with the invention.

Figure 25B:
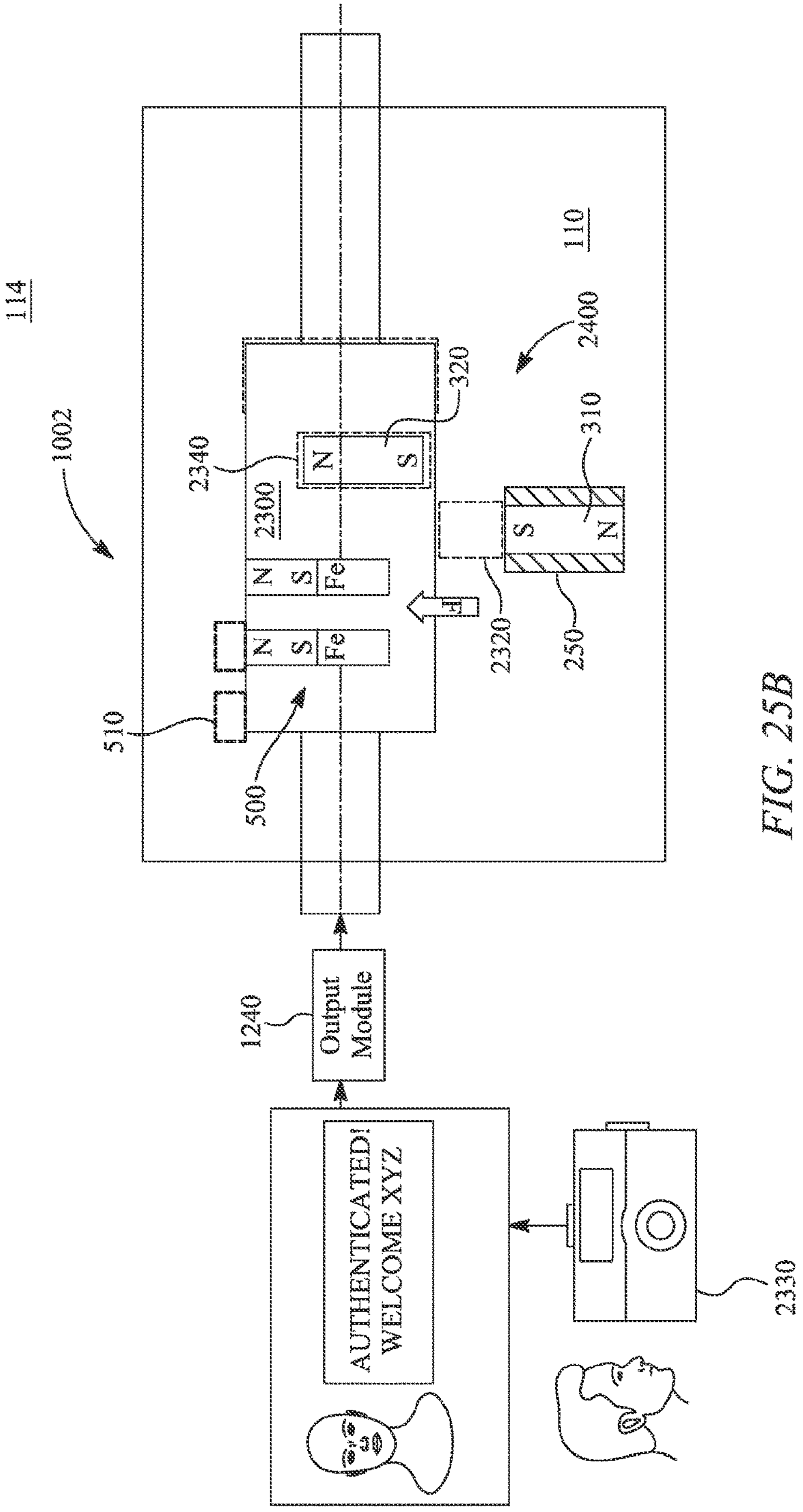
FIG. 25B demonstrates an embodiment 114 of the single axis digital lock and its operating software and user interface in the opened state, in accordance with the invention as a block diagram.

FIG. 25B demonstrates an embodiment 114 of the single axis translational digital lock 1002 in the opened state 2400 and associated software and hardware, in accordance with the invention as a block diagram. In response to the signal received by the output module 1240, the axle 2300 moves in a forward direction to unlock the digital lock 100 to be in the opened state 2400. Movement of the axle 2300 in the forward direction is possible in response to the authentication of the user. In an example, a return spring may be used to return the axle 2300 along with the hard magnet 320 to its initial position when the user is authenticated.

Any features of embodiment 114 may be readily combined or permuted with any of the other embodiments 10, 20, 30, 40, 50, 51, 60, 70, 80, 90, 91, 92, 93, 94, 95, 96, 97, 98, 99, 101, 102, 103, 104, 105, 106, 107, 108, 109, 116, 111, 112, 113, and/or 115 in accordance with the invention.

Figure 26B:
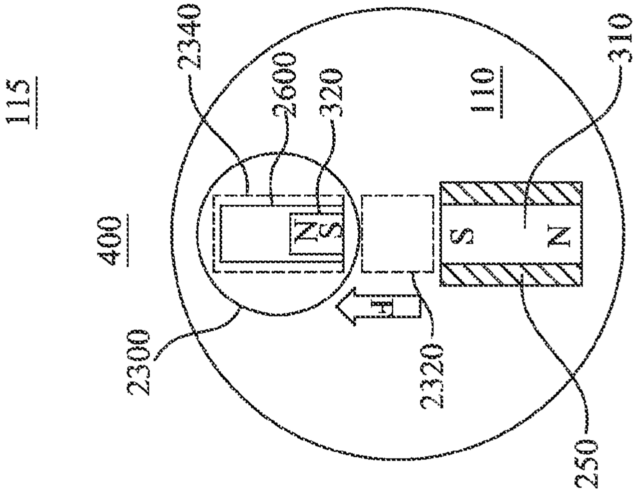
FIGS. 26A and 26B demonstrate an embodiment 115 of the digital lock hard magnet showing the locked state and the openable state, in accordance with the invention as a block diagram.
Figure 26A:
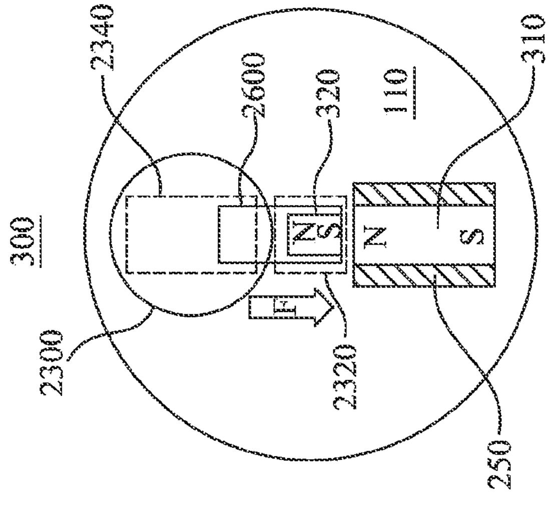

FIGS. 26A and 26B demonstrate an embodiment 115 of the digital lock 100, 1001, 1002 showing the locked state 300 and the openable state 400, in accordance with the invention as a block diagram. Referring to FIGS. 26A and 26B, the hard magnet 320 is a much smaller magnet compared to the semi hard magnet 310 and the hard magnet 320 may be located inside a pin 2600, which may be made of plastic or titanium. Further, when the digital lock 100, 1001, 1002 is in the locked state 300, the semi hard magnet 310 is configured to have a polarity such that, the north pole of the semi hard magnet 310 faces the south pole of the hard magnet 320. By virtue of magnetic principle, the semi hard magnet 310 and the hard magnet 320 are attracted to each other. As a result of such arrangement, the pin 2600 along with the hard magnet 320 is partially received in the notch 2340 of the axle 2300 and the notch 2320 of the lock body 110. Referring to FIG. 26B, when the digital lock 100 is in the openable state 400, the semi hard magnet 310 is configured to have a polarity such that, the south pole of the semi hard magnet 310 faces the south pole of the hard magnet 320. By virtue of magnetic principle, the hard magnet 320 repels away from the semi hard magnet 310.

As a result of such arrangement, the pin 2600 along with the hard magnet 320 enters into the notch 2340 of the axle 2300. In such a condition, as the pin 2600 along with the hard magnet 320 is protruded into the notch 2340 of the axle 2300, the user may be able to open the digital lock 100, 1001, 1002.

In preferable embodiments, the hard magnet 320 is much shorter than the locking pin 2600, which makes the lock easily resettable as the pin does not attach too strongly to the lock body, if the lock body 110 is made of iron for example. This will result in the digital lock 100, 1001, 1002 requiring a smaller resetting energy between states. Vice versa, a longer hard magnet 320 increases the magnetic resetting energy and is preferable in some embodiments, for example the blocking pins 500.

Any features of embodiment 115 may be readily combined or permuted with any of the other embodiments 10, 20, 30, 40, 50, 51, 60, 70, 80, 90, 91, 92, 93, 94, 95, 96, 97,

98, 99, 101, 102, 103, 104, 105, 106, 107, 108, 109, 116, 111, 112, 113, and/or 114 in accordance with the invention.

The invention has been explained in the aforementioned and sizable advantages of the invention have been demonstrated. Aspects of the invention result in a digital lock that is cheaper to manufacture as the number of components that constitute the digital lock are also less. The digital lock consumes less energy as compared to the existing mechanical and electromechanical locks even when the digital lock is in the locked state. The digital lock is reliable as it is capable of operating in different ranges of temperatures and is corrosion resistant. Further, the digital lock is a self-powered lock, user powered, Near Field Communications (NFC) powered, solar panel powered and/or battery powered which ensures a better life span of the digital locks.

The digital lock may be configured to use any biometric identification methods. The use of the position sensor is optional, as the inventive lock can also be realised without a position sensor. Drawings are for illustrative purposes, not to scale.

The invention has been explained above with reference to the aforementioned embodiments. However, it is clear that the invention is not only restricted to these embodiments, but comprises all possible embodiments within the spirit and scope of the inventive thought and the following patent claims.

What is claimed is:

1. A locking system, comprising:

a lock, comprising:

a semi-hard magnet; and a hard magnet, wherein the hard magnet is configured to move to open or close the lock, the lock is self-powered using near field communication (NFC), and the lock is digitally controlled using a mobile application.

2. The locking system of claim 1, wherein:

the semi-hard magnet has a first coercivity less than a second coercivity of the hard magnet.

3. The locking system of claim 1, wherein:

the lock is configured to open or close based on identifying a user at the mobile application.

4. The locking system of claim 3, wherein:

the mobile application is associated with a mobile computing device, and the lock is configured to be powered by NFC from the mobile computing device.

5. The locking system of claim 3, wherein:

the mobile application is configured to identify the user based on biometric identification at a mobile computing device.

6. The locking system of claim 5, wherein:

the biometric identification comprises at least one of: (i) fingerprint identification or (ii) identification using an image of the user generated using a camera associated with the mobile computing device.

7. The locking system of claim 3, wherein:

the mobile application is configured to identify the user based on communicating with a cloud service using a communication network.

8. The locking system of claim 3, wherein:

the mobile application is configured to provide notification to the user relating to success in identifying the user.

9. A software program product configured to perform one or more operations for controlling a lock, the operations comprising:

digitally controlling operation of the lock using a mobile application, wherein:

the lock comprises a semi-hard magnet and a hard magnet, the hard magnet is configured to move to open or close the lock, and the lock is self-powered using near field communication (NFC).

10. The software program product of claim 9, wherein:

the semi-hard magnet has a first coercivity less than a second coercivity of the hard magnet.

11. The software program product of claim 9, the operations further comprising:

opening or closing the lock based on identifying a user at the mobile application.

12. The software program product of claim 11, wherein:

the mobile application is associated with a mobile computing device, and the lock is configured to be powered by NFC from the mobile computing device.

13. The software program product of claim 11, wherein:

the mobile application is configured to identify the user based on biometric identification at a mobile computing device.

14. The software program product of claim 13, wherein:

the biometric identification comprises at least one of: (i) fingerprint identification or (ii) identification using an image of the user generated using a camera associated with the mobile computing device.

15. The software program product of claim 11, wherein:

the mobile application is configured to identify the user based on communicating with a cloud service using a communication network.

16. The software program product of claim 11, wherein:

the mobile application is configured to provide notification to the user relating to success in identifying the user.

* * * * *